US010531101B2

(12) United States Patent
Rosewarne et al.

(10) Patent No.: US 10,531,101 B2
(45) Date of Patent: *Jan. 7, 2020

(54) METHOD, APPARATUS AND SYSTEM FOR ENCODING AND DECODING THE SIGNIFICANCE MAP FOR RESIDUAL COEFFICIENTS OF A TRANSFORM UNIT

(71) Applicant: CANON KABUSHIKI KAISHA, Tokyo (JP)

(72) Inventors: Christopher James Rosewarne, New South Wales (AU); Alvin Edrea Labios, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/218,236

(22) Filed: Dec. 12, 2018

(65) Prior Publication Data

US 2019/0116368 A1    Apr. 18, 2019

Related U.S. Application Data

(63) Continuation of application No. 15/673,258, filed on Aug. 9, 2017, now Pat. No. 10,250,890, which is a (Continued)

(30) Foreign Application Priority Data

Jan. 19, 2012  (AU) ................. 2012200319

(51) Int. Cl.
*H04N 7/12* (2006.01)
*H04N 11/02* (2006.01)
(Continued)

(52) U.S. Cl.
CPC ........... *H04N 19/176* (2014.11); *H04N 19/11* (2014.11); *H04N 19/119* (2014.11);
(Continued)

(58) Field of Classification Search
None
See application file for complete search history.

(56) References Cited

U.S. PATENT DOCUMENTS

2005/0025246 A1   2/2005  Holcomb
2009/0169124 A1   7/2009  Wallace et al.
(Continued)

FOREIGN PATENT DOCUMENTS

CN    1492688 A   4/2004
CN    1980395 A   6/2007
(Continued)

OTHER PUBLICATIONS

J. Sole, et al., "Unified scans for the significance map and coefficient level coding in high coding efficiency", Joint Collaborative Team on Video Coding (JCT-VC) of ITU-T SG16 WP3 and ISO/IEC JTC1/SC29/WG11, 5th Meeting: Geneva, CH, Mar. 16-23, 2011.
(Continued)

*Primary Examiner* — Chikaodili E Anyikire
(74) *Attorney, Agent, or Firm* — Canon U.S.A., Inc. IP Division

(57) ABSTRACT

Disclosed is a method of decoding residual coefficients of a transform unit from a bitstream of video data. The method receives the transform unit (1500) from the bitstream of video data in which the transform unit has upper (1503) and lower (1502) level square layers. The upper level layer represents a square arrangement of at most four significant coefficient group flags with each of the significant coefficient group flags representing a non-overlapping region of the lower level layer. The method determines determining the significant coefficient group flags of the square upper level layer for the received transform unit, and determines values of residual coefficients of the square lower layer according to the determined significant coefficient group flags to
(Continued)

decode the transform unit of the bitstream of video data. Corresponding encoding methods are also disclosed.

4 Claims, 19 Drawing Sheets

Related U.S. Application Data continuation of application No. 14/372,899, filed as application No. PCT/AU2013/000035 on Jan. 18, 2013, now Pat. No. 9,769,484.

(51) Int. Cl.
| | | |
|---|---|---|
| *H04N 11/04* | (2006.01) | |
| *H04N 19/176* | (2014.01) | |
| *H04N 19/46* | (2014.01) | |
| *H04N 19/60* | (2014.01) | |
| *H04N 19/18* | (2014.01) | |
| *H04N 19/119* | (2014.01) | |
| *H04N 19/129* | (2014.01) | |
| *H04N 19/593* | (2014.01) | |
| *H04N 19/11* | (2014.01) | |

(52) U.S. Cl.
CPC .......... *H04N 19/129* (2014.11); *H04N 19/18* (2014.11); *H04N 19/46* (2014.11); *H04N 19/593* (2014.11); *H04N 19/60* (2014.11)

(56) References Cited

U.S. PATENT DOCUMENTS

| | | | |
|---|---|---|---|
| 2009/0238271 A1 | 9/2009 | Kim et al. | |
| 2010/0191534 A1 | 7/2010 | Ryu et al. | |
| 2013/0107969 A1* | 5/2013 | Nguyen | ................ H04N 19/70 375/240.18 |
| 2013/0128985 A1* | 5/2013 | He | ....................... H04N 19/176 375/240.18 |
| 2013/0177070 A1* | 7/2013 | Seregin | .................. H04N 19/13 375/240.02 |
| 2013/0272379 A1* | 10/2013 | Sole Rojals | ......... H04N 19/176 375/240.02 |
| 2013/0336385 A1* | 12/2013 | Budagavi | ............. H04N 19/176 375/240.2 |

FOREIGN PATENT DOCUMENTS

| | | |
|---|---|---|
| CN | 101094398 A | 12/2007 |
| CN | 101137047 A | 3/2008 |
| CN | 101427584 A | 5/2009 |
| CN | 101621689 A | 1/2010 |
| CN | 101627636 A | 1/2010 |
| CN | 101743751 A | 6/2010 |
| CN | 101841713 A | 9/2010 |
| CN | 101895756 A | 11/2010 |
| CN | 102006473 A | 4/2011 |
| CN | 102265618 A | 11/2011 |
| JP | 2006324806 A | 11/2006 |
| JP | 2010166170 A | 7/2010 |
| KR | 20100007648 A | 1/2010 |
| WO | 2012005551 A2 | 1/2012 |

OTHER PUBLICATIONS

Nguyen Nguyen, et al., "Multi-level Significant Maps for Large Transform Units",Joint Collaborative Team on Video Coding (JCT-VC) of ITU-T SG16 WP3 and ISO/IEC JTC1/SC29/WG11, 7th Meeting: Geneva, Nov. 21-30, 2011.

X. Peng et al., CE6.b Report of Test 3:Interaction between SDIP and MDCS, Joint Collaborative Team on Video Coding (JCT-VC)of ITU-T SG16 WP3 and ISO/IEC JTC1/SC29/WG11,6th Meeting, Torino, IT, Jul. 14-22, 2011, 10 pages, Doc. No. JCTV-F197 (version 2), accessed May 31, 2019, URL: http://phenix.itsudparis.eu/id=2662.

\* cited by examiner

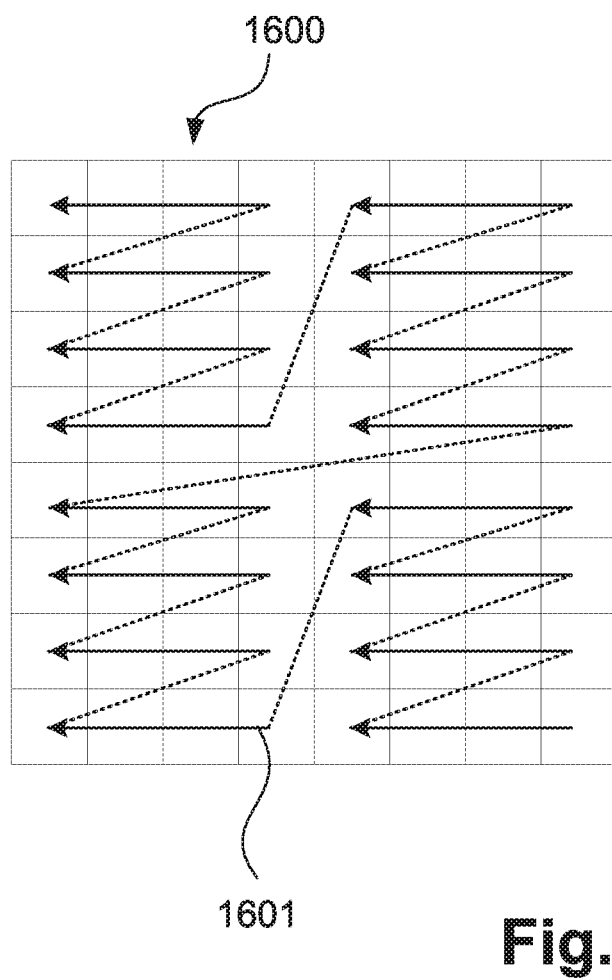
Fig. 16A
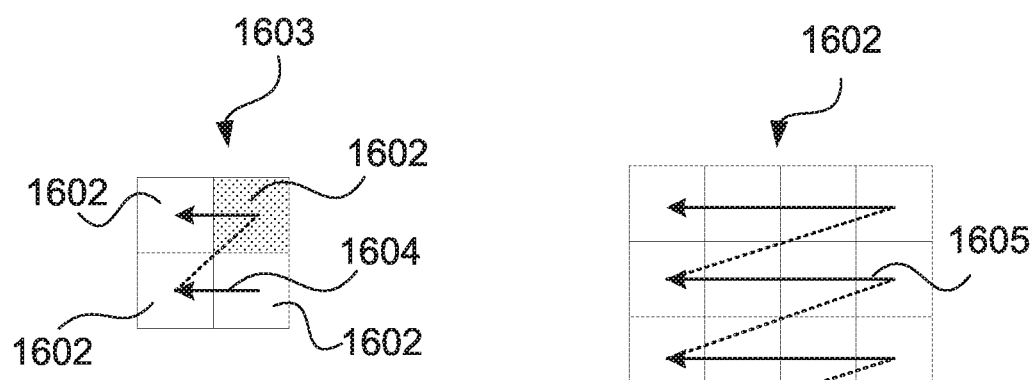
Fig. 16B
Fig. 16C

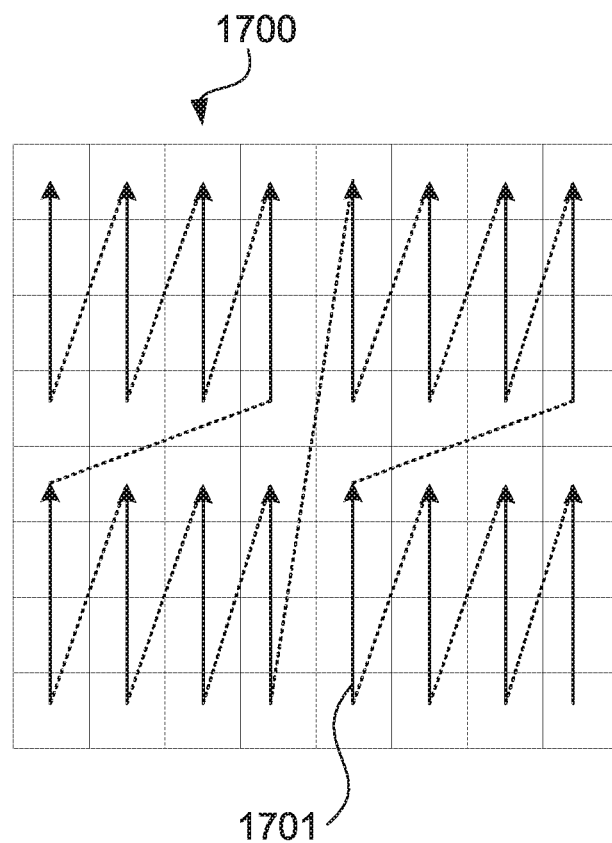
Fig. 17A
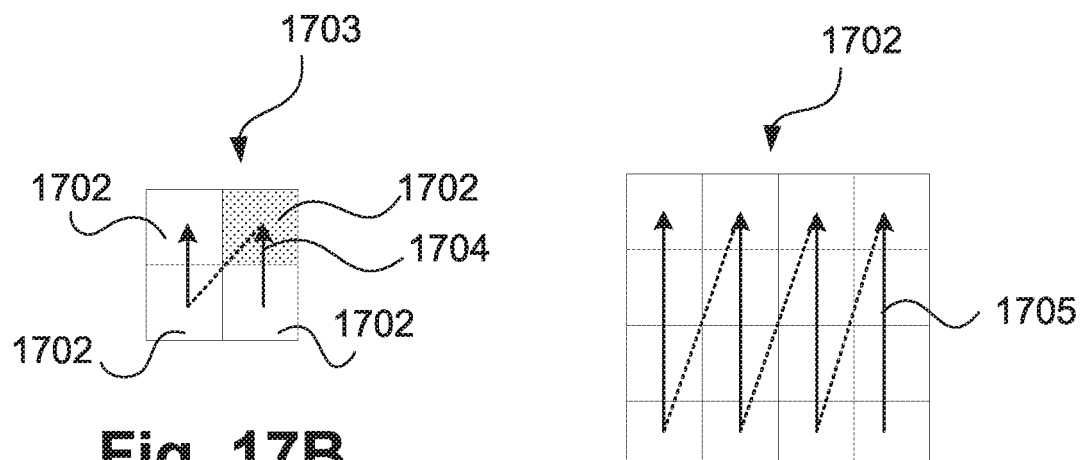
Fig. 17B
Fig. 17C

METHOD, APPARATUS AND SYSTEM FOR ENCODING AND DECODING THE SIGNIFICANCE MAP FOR RESIDUAL COEFFICIENTS OF A TRANSFORM UNIT

CROSS-REFERENCE TO RELATED APPLICATIONS

This application is a continuation of U.S. patent application Ser. No. 15/673,258, filed on Aug. 9, 2017, which is a continuation of prior U.S. patent application Ser. No. 14/372,899, filed on Jul. 17, 2014 and issued as U.S. Pat. No. 9,769,484 on Sep. 19, 2017, that is the National Phase application of PCT Application No. PCT/AU2013/000035, filed on Jan. 18, 2013 and titled "Method, apparatus and system for encoding and decoding the significance map for residual coefficients of a transform unit." This application claims the benefit under 35 U.S.C. § 119(a)-(d) of Australian Patent Application No. 2012200319, filed on Jan. 19, 2012. The above cited patent applications are incorporated herein by reference in their entirety.

TECHNICAL FIELD

The present invention relates generally to digital video signal processing and, in particular, to a method, apparatus and system for encoding and decoding residual coefficients of a transform unit (TU), wherein the transform unit (TU) may have a square shape or a non-square shape.

BACKGROUND

Many applications for video coding currently exist, including applications for transmission and storage of video data. Many video coding standards have also been developed and others are currently under development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has the goal of producing a new video coding standard to significantly outperform a presently existing video coding standard, known as "H.264/MPEG-4 AVC". The H.264/MPEG-4 AVC standard is itself a large improvement on previous video coding standards, such as MPEG-4 and ITU-T H.263. The new video coding standard under development has been named "high efficiency video coding (HEVC)". The Joint Collaborative Team on Video Coding JCT-VC is also considering implementation challenges arising from technology proposed for high efficiency video coding (HEVC) that create difficulties when scaling implementations of the standard to operate at high resolutions or high frame rates.

One area of the H.264/MPEG-4 AVC video coding standard that presents difficulties for achieving high compression efficiency is the coding of residual coefficients used to represent video data. Video data is formed by a sequence of frames, with each frame having a two-dimensional array of samples. Typically, frames include one luminance and two chrominance channels. Each frame is decomposed into an array of largest coding units (LCUs). The largest coding units (LCUs) have a fixed size, with edge dimensions being a power of two and having equal width and height, such as 64 luma samples. A coding tree enables the subdivision of each largest coding unit (LCU) into four coding units (CUs), each having half the width and height of a parent largest coding unit (LCU). Each of the coding units (CUs) may be further subdivided into four equally-sized coding units (CUs). Such a subdivision process may be applied recursively until a smallest coding unit (SCU) size is reached, enabling coding units (CUs) to be defined down to a minimum supported size. The recursive subdivision of a largest coding unit, into a hierarchy of coding units is referred, has a quadtree structure and is referred to as the coding tree. This subdivision process is encoded in a communications bitstream as a sequence of flags, coded as bins. Coding units therefore have a square shape.

A set of coding units exist in the coding tree that are not further sub-divided, occupying the leaf nodes of the coding tree. Transform trees exist at these coding units. A transform tree may further decompose a coding unit using a quadtree structure as used for the coding tree. At the leaf nodes of the transform tree, residual data is encoded using transform units (TUs). In contrast to the coding tree, the transform tree may subdivide coding units into transform units having a non-square shape. Further, the transform tree structure does not require that transform units (TUs) occupy all of the area provided by the parent coding unit.

Each coding unit at the leaf nodes of the coding trees are subdivided into one or more arrays of predicted data samples, each known as a prediction unit (PU). Each prediction unit (PU) contains a prediction of a portion of the input video frame data, derived by applying an intra-prediction or an inter-prediction process. Several methods may be used for coding prediction units (PUs) within a coding unit (CU). A single prediction unit (PU) may occupy an entire area of the coding unit (CU), or the coding unit (CU) may be split into two equal-sized rectangular prediction units (PUs), either horizontally or vertically. Additionally, the coding units (CU) may be split into four equal-sized square prediction units (PUs).

A video encoder compresses the video data into a bitstream by converting the video data into a sequence of syntax elements. A context adaptive binary arithmetic coding (CABAC) scheme is defined within the high efficiency video coding (HEVC) standard under development, using an identical arithmetic coding scheme as to that defined in the MPEG4-AVC/H.264 video compression standard. In the high efficiency video coding (HEVC) standard under development, when context adaptive binary arithmetic coding (CABAC) is in use, each syntax element is expressed as a sequence of bins, where the bins are selected from a set of available bins. The set of available bins is obtained from a context model, with one context per bin. Each context holds a likely bin value (the 'valMPS'), and a probability state for the arithmetic encoding or arithmetic decoding operation. Note that bins may also be bypass coded, where there is no association with a context. Bypass coded bins consume one bit in the bitstream and therefore are suited to bins with equal probability of being one-valued or zero-valued. Creating such a sequence of bins from a syntax element is known as "bin arising" the syntax elements.

In a video encoder or video decoder, as separate context information is available for each bin, context selection for bins provides a means to improve coding efficiency. In particular, coding efficiency may be improved by selecting a particular bin such that statistical properties from previous instances of the bin, where the associated context information was used, correlate with statistical properties of a current instance of the bin. Such context selection frequently utilises spatially local information to determine the optimal context.

In the high efficiency video coding (HEVC) standard under development and in H.264/MPEG-4 AVC, a prediction for a current block is derived, based on reference sample data either from other frames, or from neighbouring regions within the current block that have been previously decoded. The difference between the prediction and the desired sample data is known as the residual. A frequency domain representation of the residual is a two-dimensional array of residual coefficients. By convention, the upper-left corner of the two-dimensional array contains residual coefficients representing low-frequency information.

In typical video data, the majority of the changes in sample values are gradual, resulting in a predominance of low-frequency information within the residual. This manifests as larger magnitudes for residual coefficients located in the upper-left corner of the two-dimensional array.

The property of low-frequency information being predominant in the upper-left corner of the two-dimensional array of residual coefficients may be exploited by the chosen binarisation scheme to minimise the size of the residual coefficients in the bitstream.

HM-5.0 divides the transform unit (TU) into a number of sub-sets and scans the residual coefficients in each sub-set in two passes. The first pass encodes flags indicating the status of the residual coefficients as being nonzero-valued (significant) or zero-valued (non-significant). This data is known as a significance map. A second pass encodes the magnitude and sign of significant residual coefficients, known as the coefficient levels.

A provided scan pattern enables scanning the two-dimensional array of residual coefficients into a one-dimensional array. In the HM-5.0, the provided scan pattern is used for processing both the significance map and the coefficient levels. By scanning the significance map using the provided scan pattern, the location of the last significant coefficient in the two-dimensional significance map may be determined. Scan patterns may be horizontal, vertical or diagonal.

The high efficiency video coding (HEVC) test model 5.0 (HM-5.0) provides support for residual blocks, also known as transform units (TUs) having both a square shape and a non-square shape. Each transform unit (TU) contains a set of residual coefficients. Residual blocks having equally sized side dimensions are known as square transform units (TUs) and residual blocks having unequally sized side dimensions are known as non-square transform units (TUs).

Transform unit (TU) sizes supported in HM-5.0 are 4×4, 8×8, 16×16, 32×32, 4×16, 16×4, 8×32 and 32×8. Transform unit (TU) sizes are typically described in terms of luma-samples, however when a chroma format of 4:2:0 is used, each chroma sample occupies the area of 2×2 luma samples. Accordingly, scanning transform units (TUs) to encode chroma residual data uses scan patterns of half the horizontal and vertical dimensions, such as 2×2 for a 4×4 luma residual block. For the purpose of scanning and coding the residual coefficients, the 16×16, 32×32, 4×16, 16×4, 8×32 and 32×8 transform units (TUs) are divided into a number of sub-blocks, i.e.: a lower-layer of the transform unit (TU) scan, having a size of 4×4, with a corresponding map existing within HM-5.0. In HM-5.0, sub-blocks for these transform unit (TU) sizes are co-located with sub-sets in the transform unit (TU). The set significant coefficient flags within a portion of the significance map collocated within one sub-block is referred to as a significant coefficient group. For the 16×16, 32×32, 4×16, 16×4, 8×32 and 32×8 transform units (TUs), the significance map coding makes use of a two-level scan. The upper level scan performs a scan, such as a backward diagonal down-left scan, to code or infer flags representing the significant coefficient groups of each sub-block. Within the sub-blocks, a scan, such as the backward diagonal down-left scan, is performed to code the significant coefficient flags for sub-blocks having a one-valued significant coefficient group flag. For a 16×16 transform unit (TU), a 4×4 upper-level scan is used. For a 32×32 transform unit (TU), an 8×8 upper-level scan is used. For 16×4, 4×16, 32×8 and 8×32 transform unit (TU) sizes, 4×1, 1×4, 8×2 and 2×8 upper-level scans are used respectively.

At each transform unit (TU), residual coefficient data may be encoded into a bitstream. Each "residual coefficient" is a number representing image characteristics within a transform unit in the frequency (DCT) domain and occupying a unique location within the transform unit. A transform unit is a block of residual data samples that may be transformed between the spatial and the frequency domains. In the frequency domain, the transform unit (TU) encodes the residual data samples as residual coefficient data. Side dimensions of transform units are sized in powers of two (2), ranging from 4 samples to 32 samples for a "Luma" channel, and 2 to 16 samples for a "Chroma" channel. The leaf nodes of the transform unit (TU) tree may contain either a transform unit (TU) or nothing at all, in the case where no residual coefficient data is required.

As the spatial representation of the transform unit is a two-dimensional array of residual data samples, as described in detail below, a frequency domain representation resulting from a transform, such as a modified discrete cosine transform (DCT), is also a two-dimensional array of residual coefficients. The spectral characteristics of a typical sample data within a transform unit (TU) are such that the frequency domain representation is more compact than the spatial representation. Further, the predominance of lower-frequency spectral information typical in a transform unit (TU) results in a clustering of larger-valued residual coefficients towards the upper-left of the transform unit (TU), where low-frequency residual coefficients are represented.

Modified discrete cosine transforms (DCTs) or modified discrete sine transforms (DSTs) may be used to implement the residual transform. Implementations of the residual transform are configured to support each required transform unit (TU) size. In a video encoder, the residual coefficients from the residual transform are scaled and quantised. The scaling and quantisation reduces the magnitude of the residual coefficients, reducing the size of the data coded into the bitstream at the cost of reducing the image quality.

One aspect of the complexity of the high efficiency video coding (HEVC) standard under development is the number of look-up tables required in order to perform the scanning. Each additional look-up table results in an undesirable consumption of memory and hence reducing the number of look-up tables required is one aspect of complexity reduction.

SUMMARY

It is an object of the present invention to substantially overcome, or at least ameliorate, one or more disadvantages of existing arrangements.

According to one aspect of the present disclosure there is provided a method of decoding residual coefficients of a transform unit from a bitstream of video data, the method comprising:

receiving the transform unit from the bitstream of video data, the transform unit having upper and lower level square layers, the upper level layer representing a square arrangement of at most four significant coefficient group flags with each of the significant coefficient group flags representing a non-overlapping region of the lower level layer;

determining the significant coefficient group flags of the square upper level layer for the received transform unit; and determining values of residual coefficients of the square lower layer according to the determined significant coefficient group flags to decode the transform unit of the bitstream of video data.

Preferably each of the non-overlapping regions represented by the at most four significant coefficient group flags are square regions, each with sixteen residual coefficients.

Desirably the upper level layer has four significant coefficient flags, the method comprising the further step of determining a scan pattern for each of the non-overlapping regions of the lower level layer by applying an offset to a predetermined scan pattern.

The method may also determine the significant coefficient group flags of the square upper level layer by decoding the significant coefficient flags encoded in the bitstream.

Preferably the determining of the significant coefficient group flags of the square upper level layer comprises inferring at least one of the significant coefficient flags.

Advantageously the lower level layer of the transform unit is formed as sub-blocks, and the determining values of residual coefficients of the square lower layer according to the determined significant coefficient group flags comprises iterating over each of the sub-blocks of the transform unit. Desirably the iterating forms a linear array representative of each of the sub-blocks, in which a corresponding offset value is used to reconstruct each sub-block from the linear array.

In a specific implementation the upper level layer represents a square arrangement of four significant coefficient group flags.

In one implementation a scan direction of the lower layer of the transform unit is selected according to an intra-prediction mode applied to the transform unit. In another a scan direction of the upper layer of the transform unit is selected according to an intra-prediction mode applied to the transform unit. Further a scan direction of the upper layer of the transform unit is diagonal and independent of a scan direction of the lower layer of the transform unit.

According to another aspect of the present disclosure there is provided a method of encoding residual coefficients of a transform unit in a bitstream of video data, the method comprising:

receiving values of residual coefficients for a square lower layer of the transform unit;

determining significant coefficient group flags for a square upper level layer of the transform unit, the upper level layer representing a square arrangement of at most four significant coefficient group flags with each of the significant coefficient group flags representing a non-overlapping region of the lower level layer; and encoding the values of the residual coefficients for the square lower layer and the significant coefficient group flags of the square upper level layer to encode the transform unit in the bitstream of video data.

According to another aspect there is provided a method of decoding residual coefficients of a transform unit from a bitstream of video data, the method comprising:

receiving the transform unit from the bitstream of video data, the transform unit having upper level and lower level square layers, the upper level square layer representing a square arrangement of significant coefficient group flags with each of the significant coefficient group flags representing a non-overlapping region of the lower level square layer;

determining a scan pattern of the upper level square layer and lower level square layer according to an intra-prediction mode, the scan pattern of upper level square layer and lower level square layer being the same;

determining the significant coefficient group flags of the upper level square layer for the received transform unit according to the determined scan pattern; and determining values of residual coefficients of the lower level square layer according to the determined significant coefficient group flags to decode the transform unit of the bitstream of video data.

Other aspects are also disclosed.

BRIEF DESCRIPTION OF THE DRAWINGS

At least one embodiment of the present invention will now be described with reference to the following drawings, in which:

FIGS. 16A to 16C illustrate a method according to the present disclosure for scanning residual coefficients of an 8×8 transform unit (TU) using a backward horizontal scan;

FIGS. 17A to 17C illustrate a method according to the present disclosure for scanning residual coefficients of an 8×8 transform unit (TU) using a backward vertical scan.

DETAILED DESCRIPTION INCLUDING BEST MODE

Figure 1:
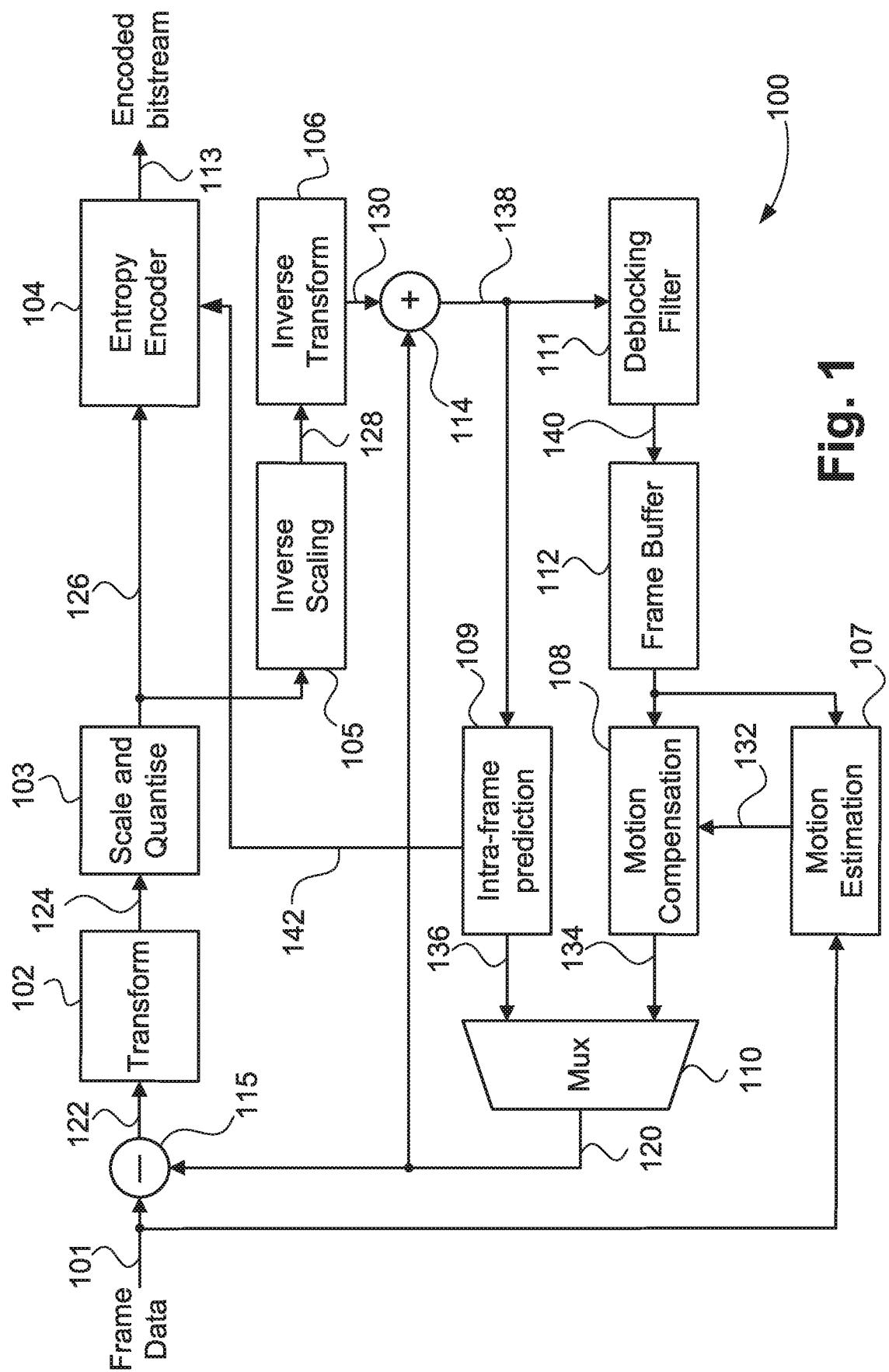
FIG. 1 is a schematic block diagram showing functional modules of a video encoder.

Where reference is made in any one or more of the accompanying drawings to steps and/or features, which have the same reference numerals, those steps and/or features have for the purposes of this description the same function(s) or operation(s), unless the contrary intention appears.

Figure 2:
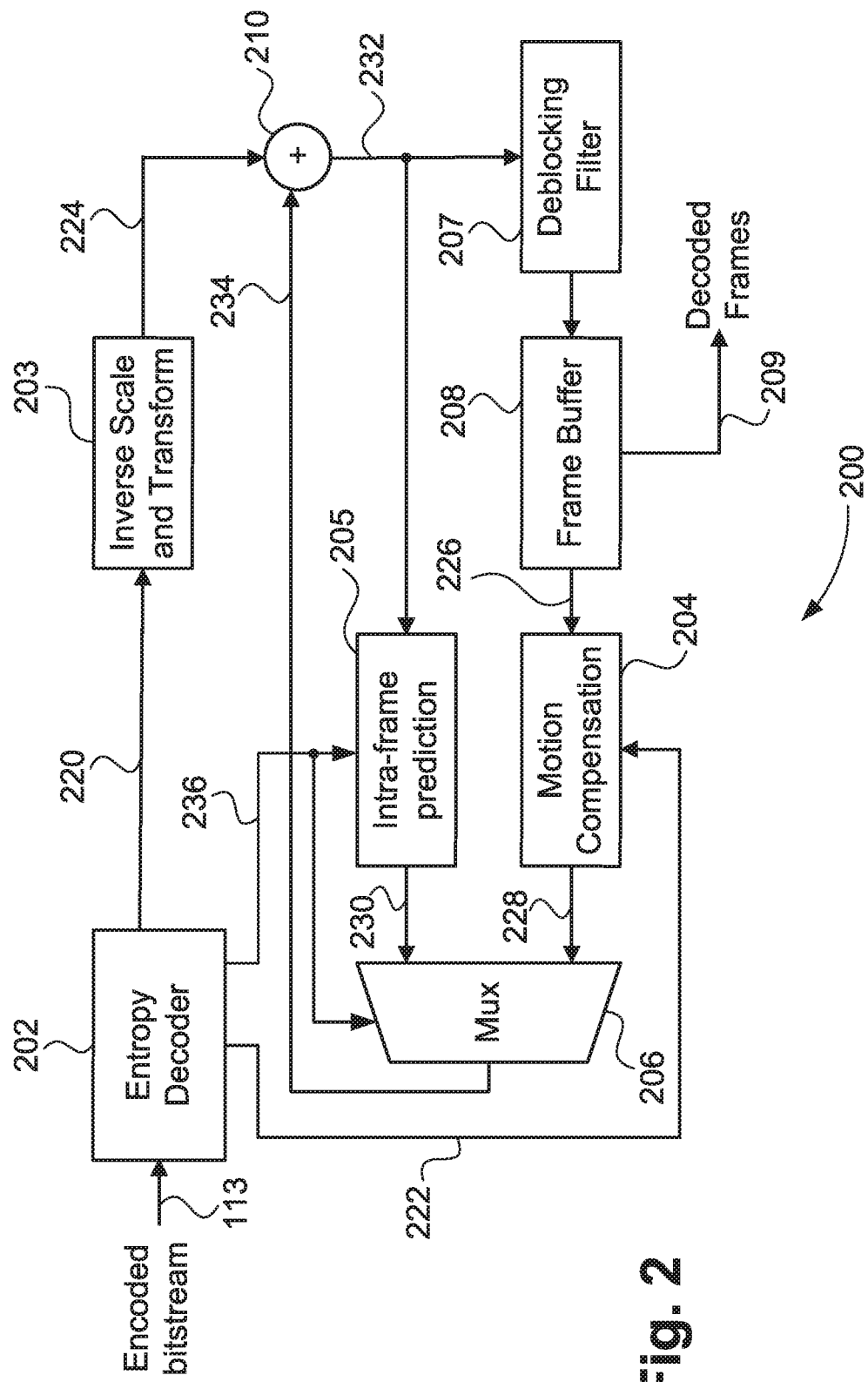
FIG. 2 is a schematic block diagram showing functional modules of a video decoder.

FIG. 1 is a schematic block diagram showing functional modules of a video encoder 100. FIG. 2 is a schematic block diagram showing functional modules of a corresponding video decoder 200. The video encoder 100 and video decoder 200 may be implemented using a general-purpose computer system 300, as shown in FIGS. 3A and 3B where the various functional modules may be implemented by dedicated hardware within the computer system 300, by software executable within the computer system 300, or alternatively by a combination of dedicated hardware and software executable within the computer system 300.

Figure 3A:
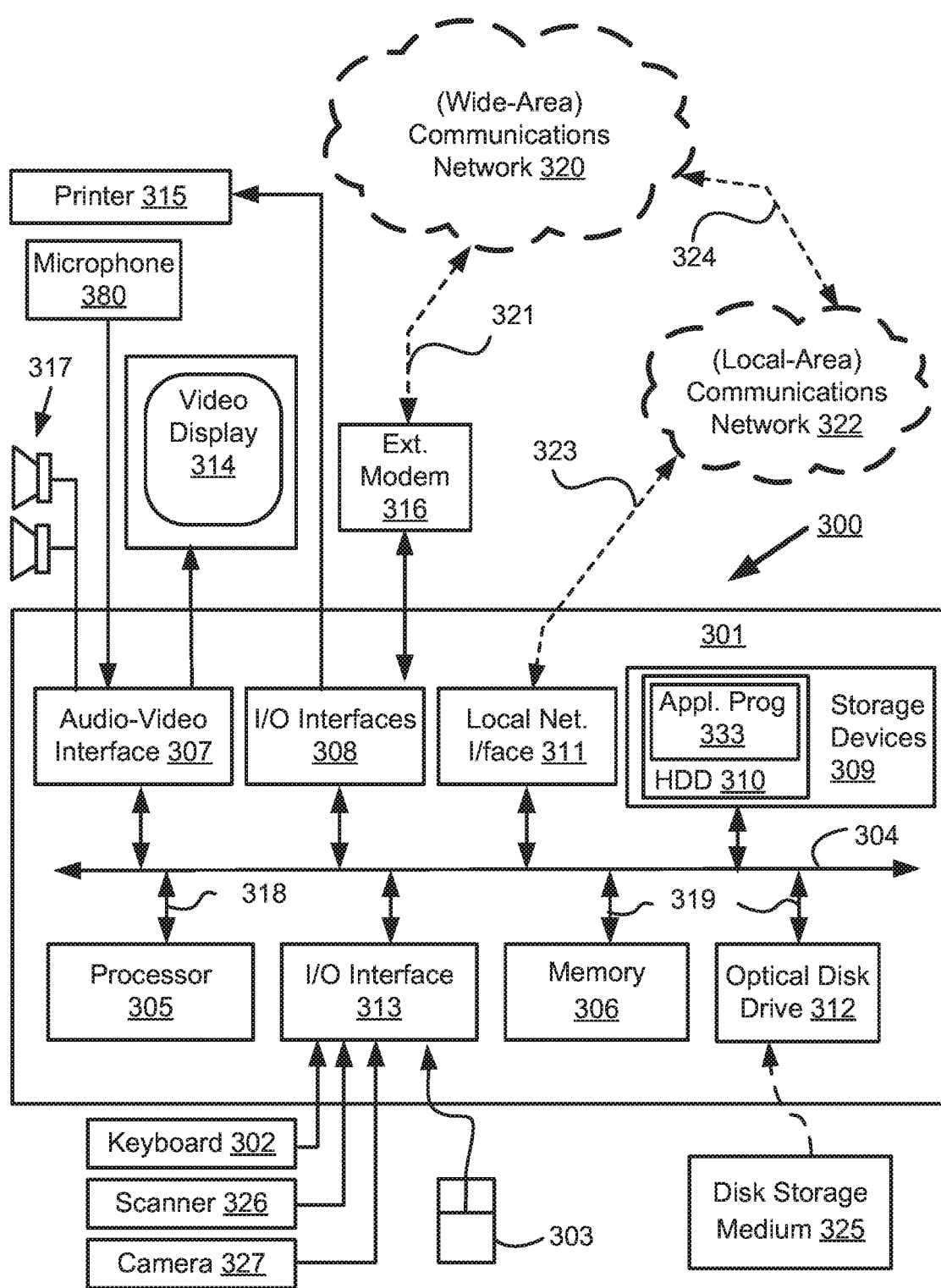
FIGS. 3A and 3B form a schematic block diagram of a general purpose computer system upon which the encoder and decoder of FIGS. 1 and 2, respectively, may be practiced.
Figure 3B:
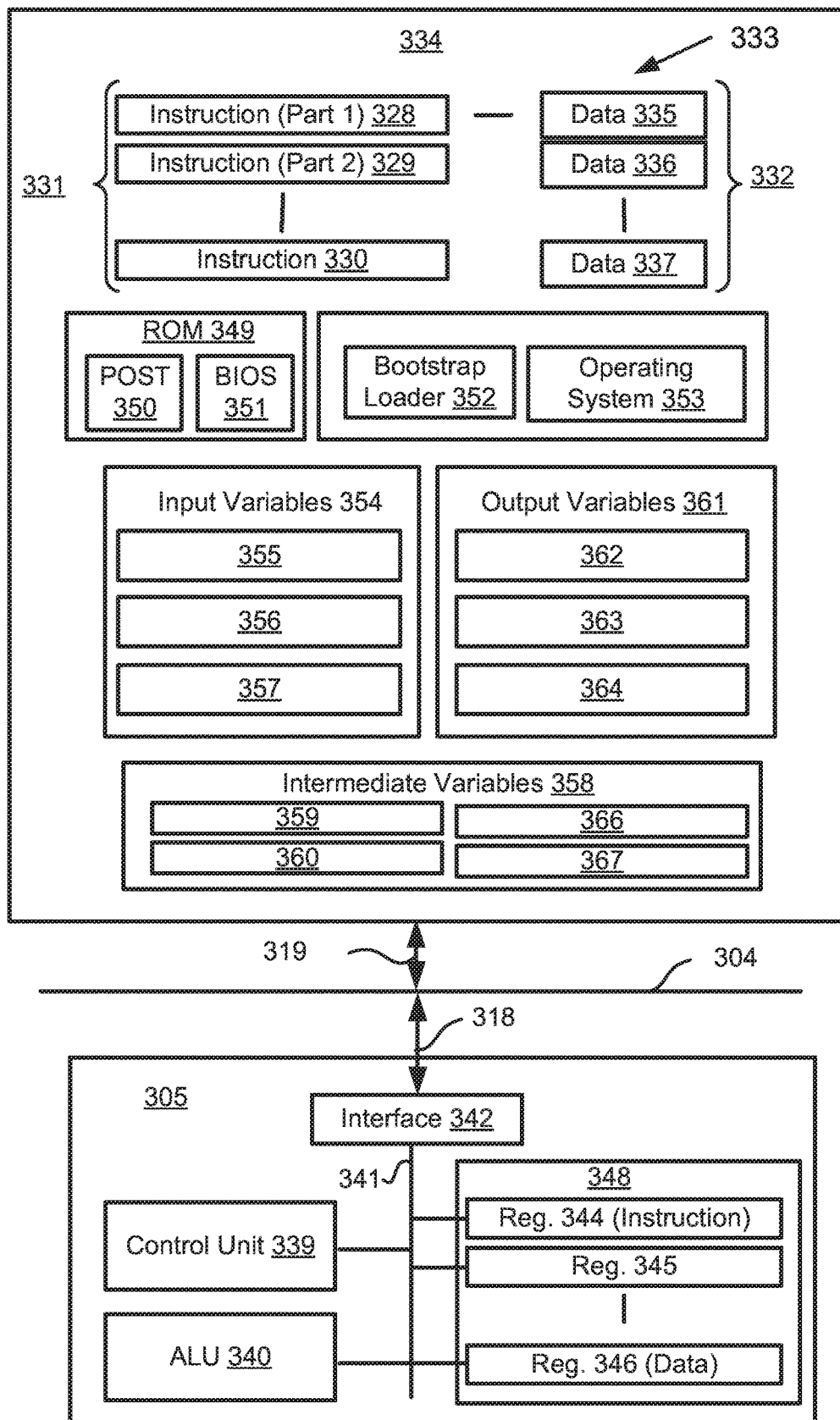

As seen in FIG. 3A, the computer system 300 includes: a computer module 301; input devices such as a keyboard 302, a mouse pointer device 303, a scanner 326, a camera 327, and a microphone 380; and output devices including a printer 315, a display device 314 and loudspeakers 317. An external Modulator-Demodulator (Modem) transceiver device 316 may be used by the computer module 301 for communicating to and from a communications network 320 via a connection 321. The communications network 320 may be a wide-area network (WAN), such as the Internet, a cellular telecommunications network, or a private WAN. Where the connection 321 is a telephone line, the modem 316 may be a traditional "dial-up" modem. Alternatively, where the connection 321 is a high capacity (e.g., cable) connection, the modem 316 may be a broadband modem. A wireless modem may also be used for wireless connection to the communications network 320.

The computer module 301 typically includes at least one processor unit 305, and a memory unit 306. For example, the memory unit 306 may have semiconductor random access memory (RAM) and semiconductor read only memory (ROM). The computer module 301 also includes an number of input/output (I/O) interfaces including: an audio-video interface 307 that couples to the video display 314, loudspeakers 317 and microphone 380; an I/O interface 313 that couples to the keyboard 302, mouse 303, scanner 326, camera 327 and optionally a joystick or other human interface device (not illustrated); and an interface 308 for the external modem 316 and printer 315. In some implementations, the modem 316 may be incorporated within the computer module 301, for example within the interface 308. The computer module 301 also has a local network interface 311, which permits coupling of the computer system 300 via a connection 323 to a local-area communications network 322, known as a Local Area Network (LAN). As illustrated in FIG. 3A, the local communications network 322 may also couple to the wide network 320 via a connection 324, which would typically include a so-called "firewall" device or device of similar functionality. The local network interface 311 may comprise an Ethernet™ circuit card, a Bluetooth™ wireless arrangement or an IEEE 802.11 wireless arrangement; however, numerous other types of interfaces may be practiced for the interface 311.

The I/O interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the system 300. Typically, any of the HDD 310, optical drive 312, networks 320 and 322, or camera 327 may for a source for video data to be encoded, or, with the display 314, a destination for decoded video data to be stored or reproduced.

Figure 10A:
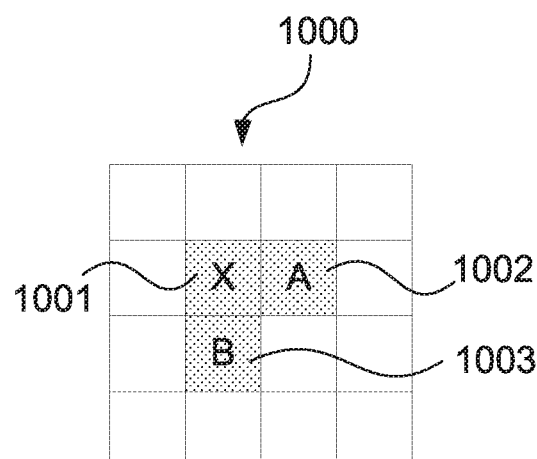
FIGS. 10A and 10B illustrate a method according to the present disclosure for representing groups of significant coefficients of an 8×8 transform unit (TU)
Figure 10B:
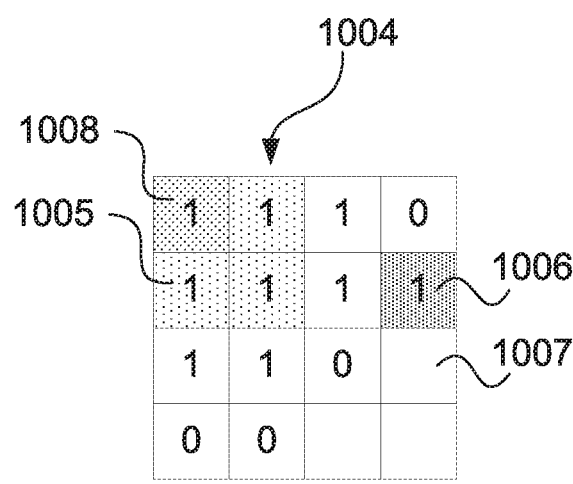
Figure 11:
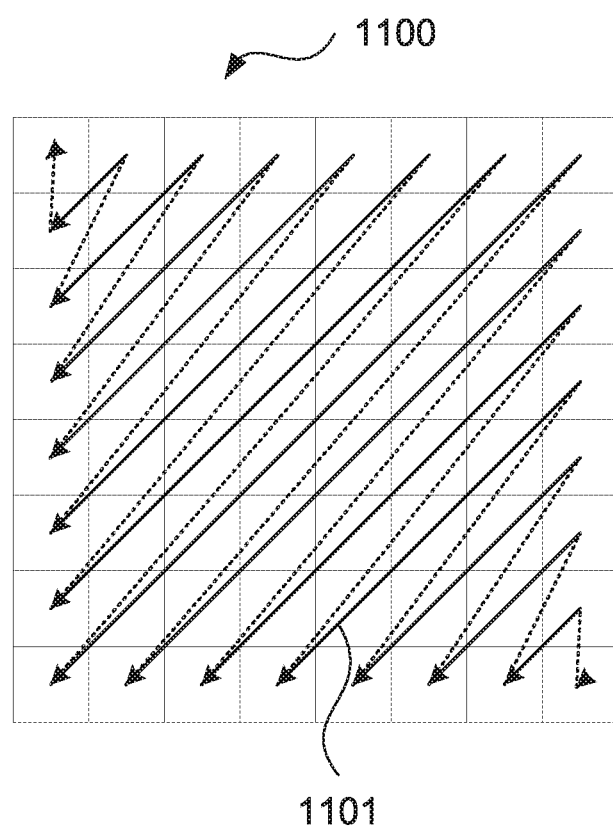
FIG. 11 is a diagram showing a conventional method for scanning residual coefficients of an 8×8 transform unit (TU) using a backward diagonal scan.

The components 305 to 313 of the computer module 301 typically communicate via an interconnected bus 304 and in a manner that results in a conventional mode of operation of the computer system 300 known to those in the relevant art. For example, the processor 305 is coupled to the system bus 304 using a connection 318. Likewise, the memory 306 and optical disk drive 312 are coupled to the system bus 304 by connections 319. Examples of computers on which the described arrangements can be practised include IBM-PC's and compatibles, Sun Sparcstations, Apple Mac™ or alike computer systems.

Where appropriate or desired, the encoder 100 and the decoder 200, as well as methods described below, may be implemented using the computer system 300 wherein the encoder 100, the decoder 200 and the processes of FIGS. 10 and 11, to be described, may be implemented as one or more software application programs 333 executable within the computer system 300. In particular, the encoder 100, the decoder 200 and the steps of the described methods are effected by instructions 331 (see FIG. 3B) in the software 333 that are carried out within the computer system 300. The software instructions 331 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 300 from the computer readable medium, and then executed by the computer system 300. A computer readable medium having such software or computer program recorded on the computer readable medium is a computer program product. The use of the computer program product in the computer system 300 preferably effects an advantageous apparatus for implementing the encoder 100, the decoder 200 and the described methods.

The software 333 is typically stored in the HDD 310 or the memory 306. The software is loaded into the computer system 300 from a computer readable medium, and executed by the computer system 300. Thus, for example, the software 333 may be stored on an optically readable disk storage medium (e.g., CD-ROM)325 that is read by the optical disk drive 312.

In some instances, the application programs 333 may be supplied to the user encoded on one or more CD-ROMs 325 and read via the corresponding drive 312, or alternatively may be read by the user from the networks 320 or 322. Still further, the software can also be loaded into the computer system 300 from other computer readable media. Computer readable storage media refers to any non-transitory tangible storage medium that provides recorded instructions and/or data to the computer system 300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 301. Examples of transitory or non-tangible computer readable transmission media that may also participate in the provision of the software, application programs, instructions and/or video data or encoded video data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303, a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380.

FIG. 3B is a detailed schematic block diagram of the processor 305 and a "memory" 334. The memory 334 represents a logical aggregation of all the memory modules (including the HDD 309 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306 of FIG. 3A. A hardware device such as the ROM 349 storing software is sometimes referred to as firmware. The POST program 350 examines hardware within the computer module 301 to ensure proper functioning and typically checks the processor 305, the memory 334 (309, 306), and a basic input-output systems software (BIOS)module 351, also typically stored in the ROM 349, for correct operation. Once the POST program 350 has run successfully, the BIOS 351 activates the hard disk drive 310 of FIG. 3A. Activation of the hard disk drive 310 causes a bootstrap loader program 352 that is resident on the hard disk drive 310 to execute via the processor 305. This loads an operating system 353 into the RAM memory 306, upon which the operating system 353 commences operation. The operating system 353 is a system level application, executable by the processor 305, to fulfil various high level functions, including processor management, memory management, device management, storage management, software application interface, and generic user interface.

The operating system 353 manages the memory 334 (309, 306) to ensure that each process or application running on the computer module 301 has sufficient memory in which to execute without colliding with memory allocated to another process. Furthermore, the different types of memory available in the system 300 of FIG. 3A must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

As shown in FIG. 3B, the processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal busses 341 functionally interconnect these functional modules. The processor 305 typically also has one or more interfaces 342 for communicating with external devices via the system bus 304, using a connection 318. The memory 334 is coupled to the bus 304 using a connection 319.

The application program 333 includes a sequence of instructions 331 that may include conditional branch and loop instructions. The program 333 may also include data 332 which is used in execution of the program 333. The instructions 331 and the data 332 are stored in memory locations 328, 329, 330 and 335, 336, 337, respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328 and 329.

In general, the processor 305 is given a set of instructions which are executed therein. The processor 305 waits for a subsequent input, to which the processor 305 reacts to by executing another set of instructions. Each input may be provided from one or more of a number of sources, including data generated by one or more of the input devices 302, 303, data received from an external source across one of the networks 320, 302, data retrieved from one of the storage devices 306, 309 or data retrieved from a storage medium 325 inserted into the corresponding reader 312, all depicted in FIG. 3A. The execution of a set of the instructions may in some cases result in output of data. Execution may also involve storing data or variables to the memory 334.

The encoder 100, the decoder 200 and the described methods use input variables 354, which are stored in the memory 334 in corresponding memory locations 355, 356, 357. The encoder 100, the decoder 200 and the described methods produce output variables 361, which are stored in the memory 334 in corresponding memory locations 362, 363, 364. Intermediate variables 358 may be stored in memory locations 359, 360, 366 and 367.

Referring to the processor 305 of FIG. 3B, the registers 344, 345, 346, the arithmetic logic unit (ALU) 340, and the control unit 339 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328, 329, 330;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes of FIGS. 1, 2, 4, 5, 7 to 10, and 14 to 17 to be described is associated with one or more segments of the program 333 and is performed by the register section 344, 345, 347, the ALU 340, and the control unit 339 in the processor 305 working together to perform the fetch, decode, and execute cycles for every instruction in the instruction set for the noted segments of the program 333.

The encoder 100, the decoder 200 and the described methods may alternatively be implemented in dedicated hardware such as one or more integrated circuits performing the functions or sub functions of the described methods. Such dedicated hardware may be in the form of computerized apparatus and may include graphic processors, digital signal processors, application specific integrated circuits (ASICs), field programmable gate arrays (FPGAs) or one or more microprocessors and associated memories. Such computerized apparatus may be used to perform some coding operations in hardware and other coding operations in software executing of the hardware.

As described above, the video encoder 100 may be implemented as one or more software code modules of the software application program 333 resident on the hard disk drive 305 and being controlled in its execution by the processor 305. In particular the video encoder 100 comprises modules 102 to 112, 114 and 115 which may each be implemented as one or more software code modules of the software application program 333.

Although the video encoder 100 is an example of a high efficiency video coding (HEVC) video decoding pipeline, processing stages performed by the modules 102 to 112, 114 and 115 are common to other video codecs such as VC-1 or H.264/MPEG-4 AVC. The video encoder 100 receives unencoded frame data 101 as a series of frames including luminance and chrominance samples. The video encoder 100 divides each frame of the frame data 101 into hierarchical sets of coding units (CUs), representable for example as a coding unit (CU) tree.

The video encoder 100 operates by outputting, from a multiplexer module 110, an array of predicted data samples known as a prediction unit (PU) 120. A difference module 115 outputs the difference between the prediction unit (PU) 120 and a corresponding array of data samples received from the frame data 101, the difference being known as residual data samples 122.

The residual data samples 122 from the difference module 115 are received by a transform module 102, which converts the difference from a spatial representation to a frequency domain representation to create transform coefficients 124 for each transform unit (TU) in the transform tree. For the high efficiency video coding (HEVC) standard under development, the conversion to the frequency domain representation is implemented using a modified discrete cosine transform (DCT), in which a traditional DCT is modified to be implemented using shifts and additions. The transform coefficients 124 are then input to a scale and quantise module 103 and are scaled and quantised to produce residual coefficients 126. The scale and quantisation process results in a loss of precision. The residual coefficients 126 are taken as input to an inverse scaling module 105 which reverses the scaling performed by the scale and quantise module 103 to produce rescaled transform coefficients 128, which are rescaled versions of the residual coefficients 126. The residual coefficients 126 are also taken as input to an entropy encoder module 104 which encodes the residual coefficients in an encoded bitstream 113. Due to the loss of precision resulting from the scale and quantise module 103, the rescaled transform coefficients 128 are not identical to the original transform coefficients 124. The rescaled transform coefficients 128 from the inverse scaling module 105 are then output to an inverse transform module 106. The inverse transform module 106 performs an inverse transform from the frequency domain to the spatial domain to produce a spatial-domain representation 130 of the rescaled transform coefficients 128 identical to a spatial domain representation that is produced at a decoder.

A motion estimation module 107 produces motion vectors 132 by comparing the frame data 101 with previous frame data stored in a frame buffer module 112, typically configured within the memory 306. The motion vectors 132, are then input to a motion compensation module 108 which produces inter-predicted reference samples 134 by filtering samples stored in the frame buffer module 112, taking into account a spatial offset derived from the motion vectors 132. Not illustrated in FIG. 1, the motion vectors 132 are also passed as syntax elements to the entropy encoder module 104 for coding in the encoded bitstream 113. An intra-frame prediction module 109 produces intra-predicted reference samples 136 using samples 138 obtained from a summation module 114, which sums the output 120 of the multiplexer module 110 and the output 130 from the inverse transform module 106.

Prediction units (PUs) may be coded using intra-prediction or inter-prediction methods. The decision as to whether to use intra-prediction or inter-prediction is made according to a rate-distortion trade-off between desired bit-rate of the resulting encoded bitstream 113 and the amount of image quality distortion introduced by either the intra-prediction or inter-prediction method. The multiplexer module 110 selects either the intra-predicted reference samples 136 from the intra-frame prediction module 109 or the inter-predicted reference samples 134 from the motion compensation block 108, depending on a current prediction mode 142, determined by control logic not illustrated but well-known in the art. The prediction mode 142 is also provided to the entropy encoder 104 as illustrated and as such is used to determine or otherwise establish the scan order of transform units as will be described. Inter-frame prediction uses only a diagonal scan order, whereas intra-frame prediction may use the diagonal scan, a horizontal scan or a vertical scan order.

The summation module 114 produces a sum 138 that is input to a deblocking filter module 111. The deblocking filter module 111 performs filtering along block boundaries, producing deblocked samples 140 that are written to the frame buffer module 112 configured within the memory 306. The frame buffer module 112 is a buffer with sufficient capacity to hold data from multiple past frames for future reference.

In the video encoder 100, the residual data samples 122 within one transform unit (TU) are determined by finding the difference between data samples of the input frame data 101 and the prediction 120 of the data samples of the input frame data 101. The difference provides a spatial representation of the residual coefficients of the transform unit (TU).

Figure 12:
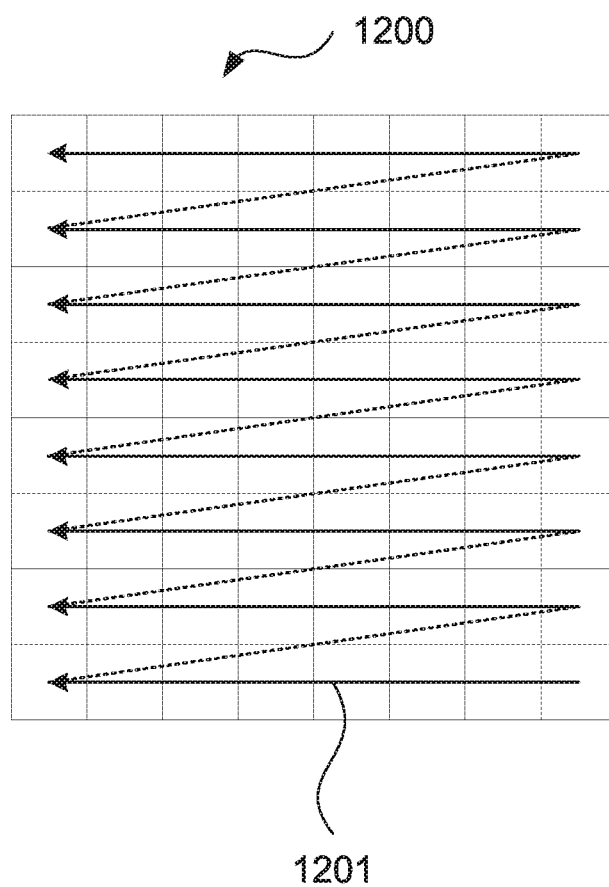
FIG. 12 is a diagram showing a conventional method for scanning residual coefficients of an 8×8 transform unit (TU) using a backward horizontal scan.
Figure 13:
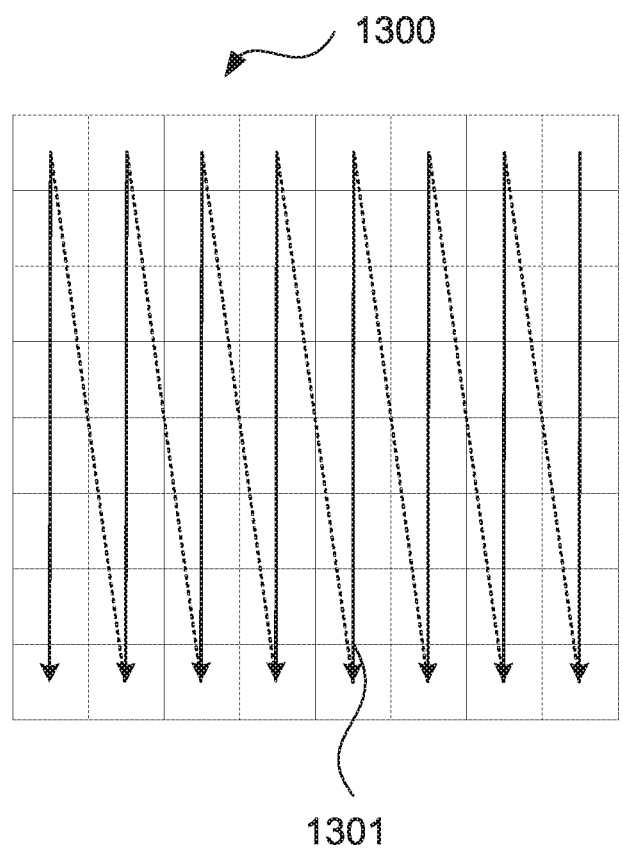
FIG. 13 is a diagram showing a conventional method for scanning residual coefficients of an 8×8 transform unit (TU) using a backward vertical scan.

In operation of the entropy encoder module 104, the residual coefficients of a transform unit (TU) are converted to the two-dimensional significance map. The significance map of the residual coefficients in the transform unit (TU) is then scanned in a particular order, known as a scan order, to form a one-dimensional list of flag values, called a list of significant coefficient flags. The scan order may be described or otherwise specified by a scan pattern, such as that received with the prediction mode 142 from the intra-prediction module 109. The intra-prediction module 109 determines an intra-prediction mode that may be used to select the scan pattern. For example, if intra-prediction mode 1 (vertical intra-prediction) is selected then horizontal scanning is used as seen in FIG. 12. If intra-prediction mode 0 (planar intra-prediction) is selected then diagonal scanning is used as seen FIG. 11 while if intra-prediction mode 2 (horizontal intra-prediction) is selected then vertical scanning is used as seen in FIG. 13. The scan pattern may be horizontal, vertical, diagonal or zig-zag. Version 5 of the high efficiency video coding (HEVC) test model performs scanning in a backward direction, however scanning in a forward direction is also possible. For 16×16, 32×32, 4×16, 16×4, 8×32 and 32×8 transform units (TUs), a two-level scan is defined where the transform unit (TU) is divided into a set of sub-blocks, each sub-block having a square shape. At an upper level, scanning is performed by scanning each lower-level using a scan such as the backward diagonal down-left scan. At the lower level, also known as the sub-block level, scanning also is performed using a scan such as the backward diagonal down-left scan. In HEVC reference model version 5.0, the scan operation starts one residual coefficient after a last significant coefficient (where 'after' is in the direction of a backward scan of the residual coefficients) and progresses until an upper-left location of the significance map is reached. Scan operations having this property and which accord to the HEVC reference model version 5.0 are known as 'backward scans'. In the HEVC reference software version 5.0, the location of the last significant coefficient is signalled by encoding co-ordinates of the coefficient in the transform unit (TU). Those familiar with the art will appreciate that the use of the adjective "last" in this context is dependent upon the particular order of scanning. What may be the "last" non-zero residual coefficient or corresponding one-valued significant coefficient flag according to one scan pattern may not be the "last" according to another scan pattern. The list of significant coefficient flags, indicating the significance of each residual coefficient prior to the last significant coefficient, is coded into the bitstream 113. The last significant coefficient flag value is not required to be explicitly encoded into the bitstream 113 because the prior coding of the location of the last significant coefficient flag implicitly indicated that this residual coefficient was significant.

The clustering of larger-valued residual coefficients towards the upper-left of the transform unit (TU) results in most significance flags earlier in the list being significant, whereas few significance flags are found later in the list.

The entropy encoder module 104 also produces syntax elements from incoming residual coefficient data (or residual coefficients) 126 received from the scale and quantise module 103. The entropy encoder module 104 outputs the encoded bitstream 113 and will be described in more detail below. For the high efficiency video coding (HEVC) standard under development, the encoded bitstream 113 is delineated into network abstraction layer (NAL) units. Each slice of a frame is contained in one NAL unit.

There are several alternatives for the entropy encoding method implemented in the entropy encoder module 104. The high efficiency video coding (HEVC) standard under development supports context adaptive binary arithmetic coding (CABAC), a variant of context adaptive binary arithmetic coding (CABAC) found in H.264/MPEG-4 AVC. An alternative entropy coding scheme is the probability interval partitioning entropy (PIPE) coder, which is well-known in the art.

For a video encoder 100 supporting multiple video coding methods, one of the supported entropy coding methods is selected according to the configuration of the encoder 100. Further, in encoding the coding units from each frame, the entropy encoder module 104 writes the encoded bitstream 113 such that each frame has one or more slices per frame, with each slice containing image data for part of the frame. Producing one slice per frame reduces overhead associated with delineating each slice boundary. However, dividing the frame into multiple slices is also possible.

The video decoder 200 may be implemented as one or more software code modules of the software application program 333 resident on the hard disk drive 305 and being controlled in its execution by the processor 305. In particular the video decoder 200 comprises modules 202 to 208 and 210 which may each be implemented as one or more software code modules of the software application program 333. Although the video decoder 200 is described with reference to a high efficiency video coding (HEVC) video decoding pipeline, processing stages performed by the modules 202 to 208 and 209 are common to other video codecs that employ entropy coding, such as H.264/MPEG-4 AVC, MPEG-2 and VC-1.

An encoded bitstream, such as the encoded bitstream 113, is received by the video decoder 200. The encoded bitstream 113 may be read from memory 306, the hard disk drive 310, a CD-ROM, a Blu-Ray™ disk or other computer readable storage medium. Alternatively the encoded bitstream 113 may be received from an external source such as a server connected to the communications network 320 or a radio-frequency receiver. The encoded bitstream 113 contains encoded syntax elements representing frame data to be decoded.

The encoded bitstream 113 is input to an entropy decoder module 202 which extracts the syntax elements from the encoded bitstream 113 and passes the values of the syntax elements to other blocks in the video decoder 200. There may be multiple entropy decoding methods implemented in the entropy decoder module 202, such as those described with reference to the entropy encoder module 104. Syntax element data 220 representing residual coefficient data is passed to an inverse scale and transform module 203 and syntax element data 222 representing motion vector information is passed to a motion compensation module 204. The inverse scale and transform module 203 performs inverse scaling on the residual coefficient data to create reconstructed transform coefficients. The module 203 then performs an inverse transform to convert the reconstructed transform coefficients from a frequency domain representation to a spatial domain representation, producing residual samples 224, such as the inverse transform described with reference to the inverse transform module 106.

The motion compensation module 204 uses the motion vector data 222 from entropy decoder module 202, combined with previous frame data 226 from a frame buffer block 208, configured within the memory 306, to produce inter-predicted reference samples 228 for a prediction unit (PU), being a prediction of output decoded frame data. When a syntax element indicates that the current coding unit was coded using intra-prediction, the intra-frame prediction module 205 produces intra-predicted reference samples 230 for the prediction unit (PU) using samples spatially neighbouring the prediction unit (PU). The spatially neighbouring samples are obtained from a sum 232 output from a summation module 210. The multiplexer module 206 selects intra-predicted reference samples or inter-predicted reference samples for the prediction unit (PU) depending on the current prediction mode, which is indicated by a syntax element in the encoded bitstream 113. The array of samples 234 output from the multiplexer module 206 is added to the residual samples 224 from the inverse scale and transform module 203 by the summation module 210 to produce the sum 232 which is then input to each of a deblocking filter module 207 and the intra-frame prediction module 205. In contrast to the encoder 100, the intra-frame prediction module 205 receives a prediction mode 236 from the entropy decoder 202. The multiplexer 206 receives an intra-frame prediction/inter-frame prediction selection signal from the entropy decoder 202. The deblocking filter module 207 performs filtering along data block boundaries to smooth artefacts visible along the data block boundaries. The output of the deblocking filter module 207 is written to the frame buffer module 208 configured within the memory 306. The frame buffer module 208 provides sufficient storage to hold multiple decoded frames for future reference. Decoded frames 209 are also output from the frame buffer module 208.

Figure 4:
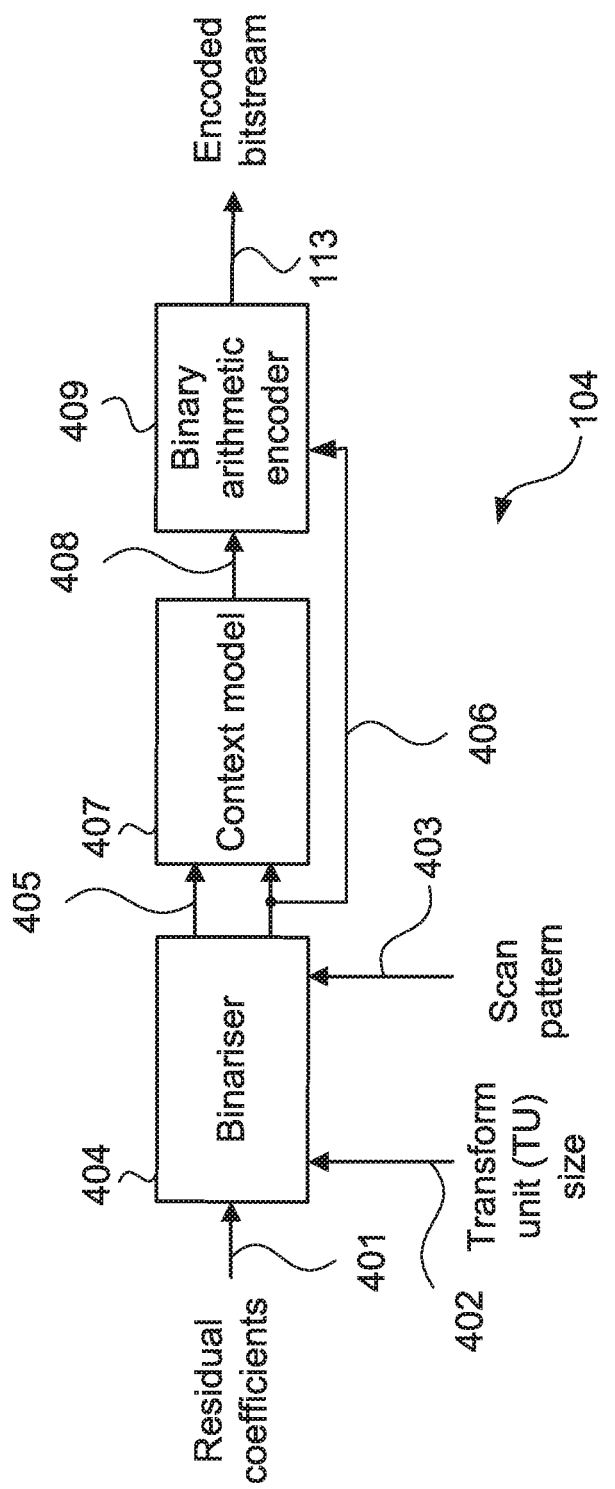
FIG. 4 is a schematic block diagram showing functional modules of an entropy encoder.

The entropy encoder 104 will be described with reference to FIG. 4. Syntax elements, such as residual coefficients 401, are input to a binariser module 404. A transform unit (TU) size 402 is input to the binariser module 404, and indicates the size of the transform unit (TU) being encoded. A scan pattern 403 is input to the binariser module 404. The binariser module 404 binarises each syntax element into a sequence of bins. Each bin comprises a bin value 406 and a context index 405. The bin value 406 and the context index 405 are received by a context model 407, which outputs a context 408, selected according to the context index 405. The context 408 is updated in accordance with the bin value 405. The method for updating the context 408 accords with that used by the context adaptive binary arithmetic coding (CABAC) in H.264/MPEG-4 AVC. The binariser module 404 binarises the residual coefficients in accordance with a method 600 described with reference to FIG. 6 below. A binary arithmetic encoder 409 uses the context 408 and the bin value 406 to encode the bin into the encoded bitstream 113.

Figure 5:
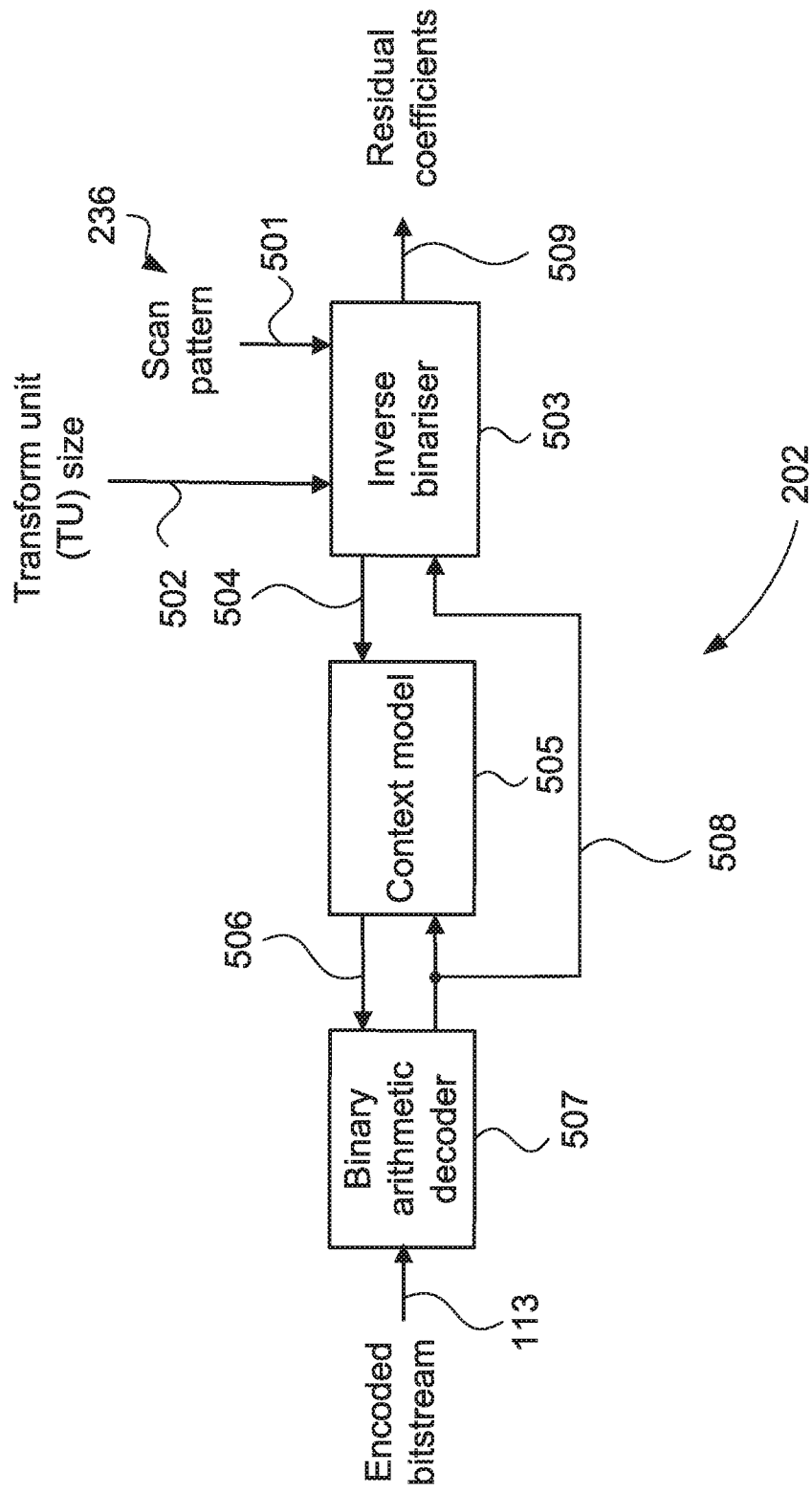
FIG. 5 is a schematic block diagram showing functional modules of an entropy decoder.

The entropy decoder 202 will be described with reference to FIG. 5. A transform unit (TU) size 502 and a scan pattern 501 are received by an inverse binariser module 503. The scan pattern 501 may be determined from the prediction mode 236 determined by the entropy decoder 202. This can be done by selecting the scan pattern based on the prediction mode 236 as described above in relation to the intra-prediction module 109 of the encoder 100. The inverse binariser module 503 outputs residual coefficients 509 by performing the reverse operation of the binariser module 404. A context index 504 is output from the inverse binariser module 503 for each bin to be decoded. A context model 505 outputs a context 506 selected by the context index 504. A binary arithmetic decoder 507 decodes a bin value 508 from the encoded bitstream 113 using the context 506. The bin value 508 is received by the context model 505 and used to update the context 506. The bin value 508 is also received by the inverse binariser module 503. The inverse binariser module 503 decodes the residual coefficients in accordance with a method 700 described with reference to FIG. 7 below.

Conventional Encoding 8×8 TU

Figure 6:
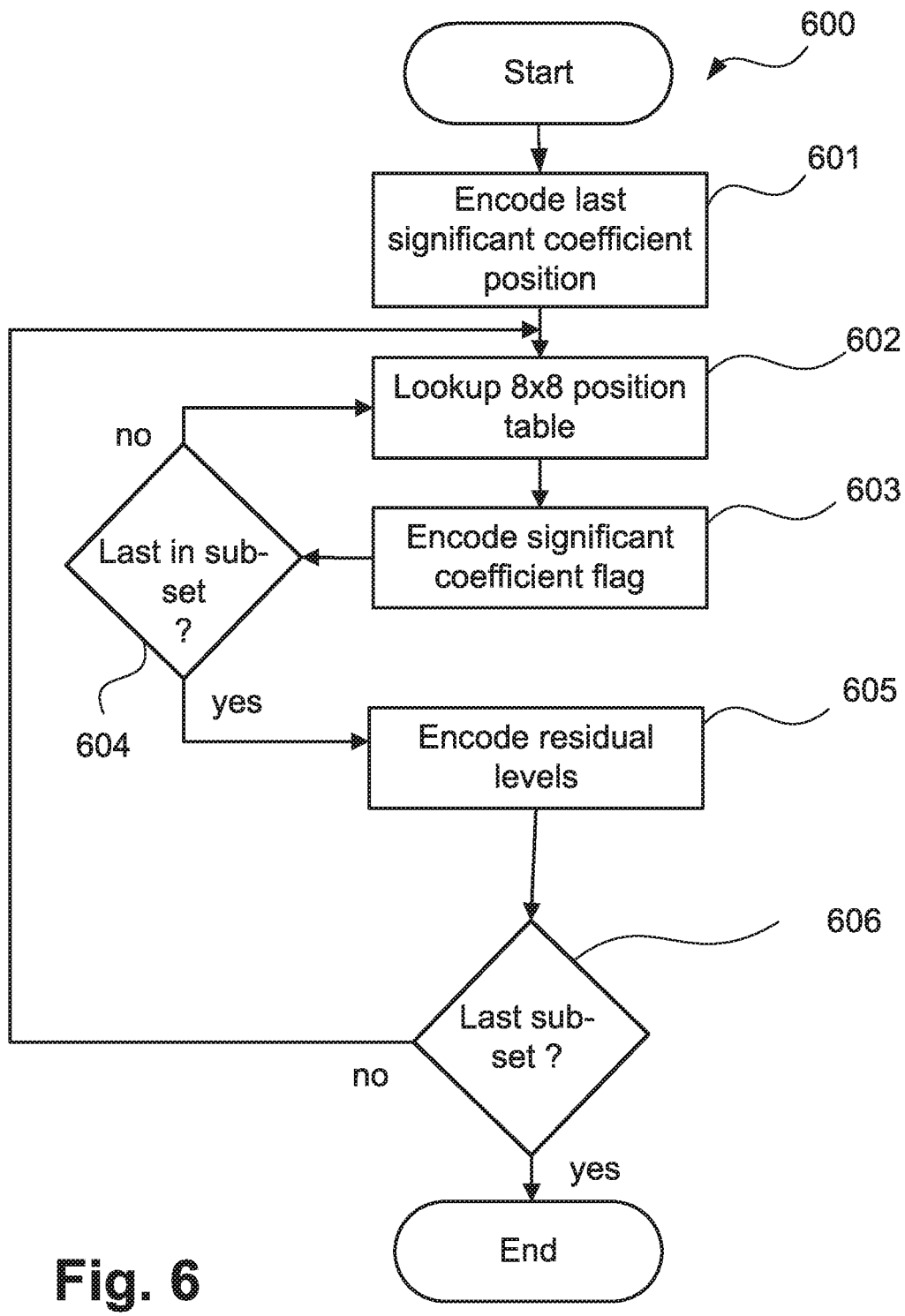
FIG. 6 is a flow diagram showing a conventional method for encoding the residual coefficients of an 8×8 transform unit (TU)

A conventional method for encoding an 8×8 transform unit (TU) 1100 using a backward diagonal scan will be described with reference to FIGS. 6 and 11. The 8×8 transform unit (TU) 1100 seen in FIG. 11 does not make use of sub-blocks. A backward diagonal down-left scan 1101 is applied over the entirety of the 8×8 transform unit (TU) 1100. The method 600 of FIG. 6 is applied using the backward diagonal down-left scan 1101 scan pattern.

An encode last significant coefficient position step 601 encodes the position of the last significant coefficient in the 8×8 transform unit (TU) 1100. The position of the last significant coefficient is defined as the position of the last non-zero residual coefficient when searching the 8×8 transform unit (TU) 1100 by applying the backward diagonal down-left scan 1101 in a forward direction.

A lookup 8×8 table step 602, an encode significant coefficient flag step 603, and a last in sub-set step 604 encode all the significant coefficients in a sub-set of 16 coefficients. Steps 603 and 604 operate firstly on the sub-set containing the last significant coefficient when a backward scan is employed. The lookup 8×8 table step 602 determines in index for the current sub-set into a table holding the 8×8 backward diagonal down-left scan 1101. The encode significant coefficient flag step 603 encodes one significant coefficient in the sub-set into the encoded bitstream 113 using the binary arithmetic encoder 409. The last in sub-set step 604 terminates a loop of steps 602 and 603 once all significant coefficients within the subset have been scanned. For a backward scan, this loop counts from a maximum value down to zero. The maximum value is 16, except for the subset containing the last significant coefficient, where the maximum value is configured to omit the last significant coefficient from the sub-set scan.

An encode residual levels step 605 encodes the residual level for each significant coefficient in the sub-set. The residual levels in a sub-set are encoded in multiple steps, each step iterating over the significant coefficients in the sub-set. Firstly, flags indicating that a significant coefficient absolute value is greater than one are encoded. Secondly, flags indicating the significant coefficients having absolute values greater than two, of the significant coefficients having absolute values greater than one are encoded. Thirdly, flags indicating the sign of each significant coefficient are encoded. Fourthly, of the significant coefficients having values greater than two, the magnitude minus three of these significant coefficients is encoded.

A last sub-set step 606 causes iteration over steps 602, 603, 604 and 605 until the first subset in the transform unit (TU) 1100 has been encoded, after any of subsets 4, 3 and 2 have been encoded, as required, after which the method 600 terminates.

A conventional method for encoding an 8×8 transform unit (TU) 1200 using a backward horizontal scan will be described with reference to FIGS. 6 and 12. The 8×8 transform unit (TU) 1200 does not make use of sub-blocks. A backward horizontal scan 1201 is applied over the entirety of the 8×8 transform unit (TU) 1200. The method 600 is applied using the defined scan pattern.

A conventional method for encoding an 8×8 transform unit (TU) 1300 using a backward vertical scan will be described with reference to FIGS. 6 and 13. The 8×8 transform unit (TU) 1300 does not make use of sub-blocks.

A backward vertical scan 1301 is applied over the entirety of the 8×8 transform unit (TU) 1300. The method 600 is applied is applied using the defined scan pattern.

Conventional Decoding 8×8 TU

Figure 7:
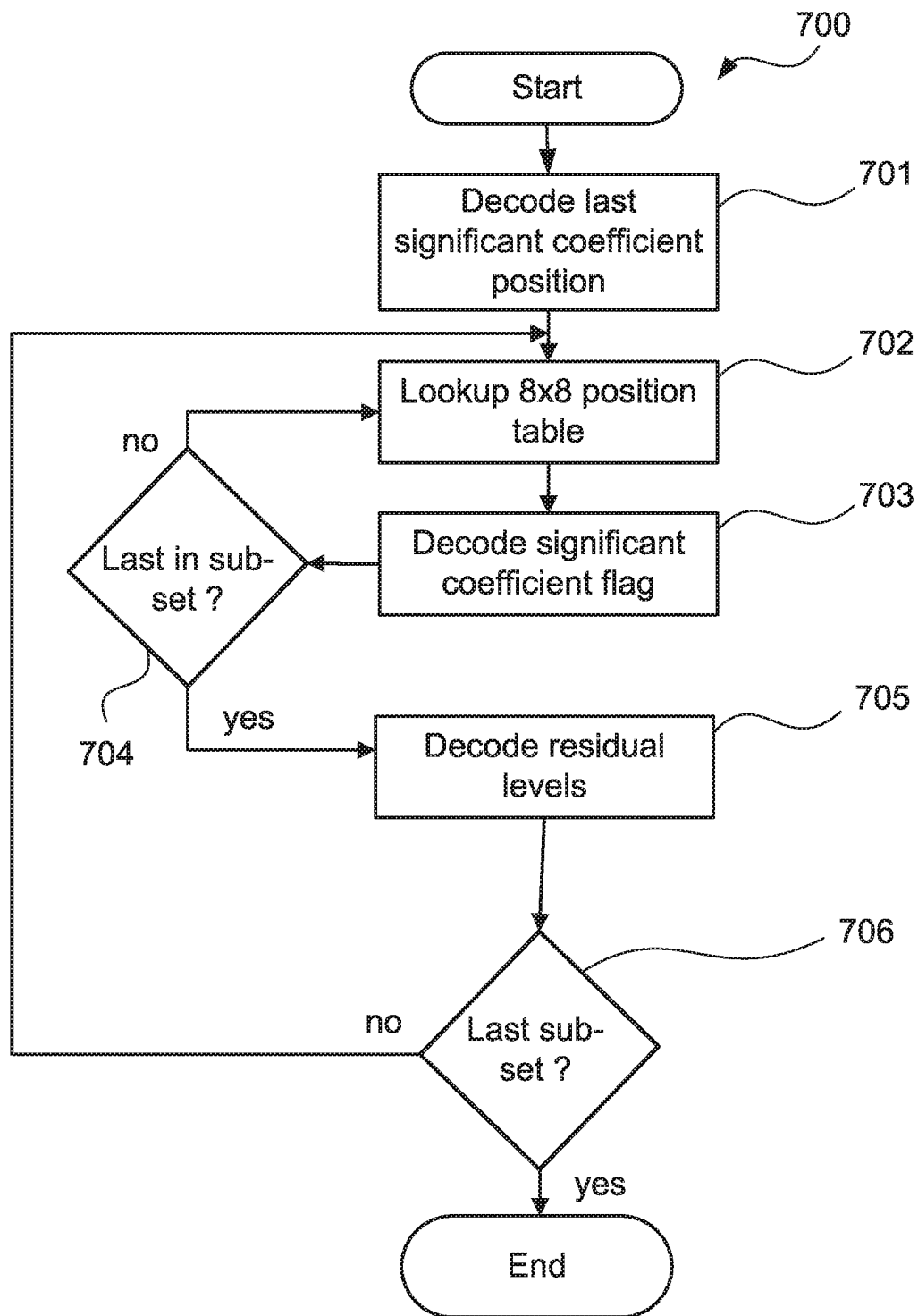
FIG. 7 is a flow diagram showing a conventional method for decoding the residual coefficients of an 8×8 transform unit (TU)

A conventional method for decoding an 8×8 transform unit (TU) 1100 using a backward diagonal scan will be described with reference to FIGS. 7 and 11. The 8×8 transform unit (TU) 1100 does not make use of sub-blocks. A backward diagonal down-left scan 1101 is applied over the entirety of the 8×8 transform unit (TU) 1100. The method 700 is applied using the defined scan pattern.

A decode last significant coefficient position step 701 decodes the location of the last significant coefficient in the 8×8 transform unit (TU) 1100, defined as the last non-zero residual coefficient when the scan pattern is applied in a forward direction.

A lookup 8×8 position table step 702, a decode significant coefficient step 703, and a last in sub-set test step 703 decode the significant coefficient flags in a sub-set by iterating over each location in the subset, from the last location to the first location, and decoding one significant coefficient flag per location. The lookup 8×8 position table step 702 determines the location within the 8×8 transform unit (TU) 1100 for the current significant coefficient within the sub-set. For sub-sets containing the last significant coefficient, the last location is defined such that the last significant coefficient position is excluded from the sub-set scan, otherwise the last position is set to 16.

A decode residual levels step 705 decodes the magnitude and sign for each significant coefficient in the sub-set. The decode residual levels step 705 decodes the residual levels of the significant coefficients by iterating over the significant coefficients in the sub-set four times. On the first iteration, flags are decoded indicating if the absolute value of the significant coefficient is greater than one. On the second iteration, flags are decoded indicating of the absolute value of significant coefficients greater than one is also greater than two. On the third iteration, flags are decoded indicating the sign for each significant coefficient. One the fourth iteration, for significant coefficients greater than two, the magnitude minus three is decoded, enabling reconstruction of the residual magnitude for cases where the magnitude is known to be greater than two.

A last sub-set test step 706 causes iteration over steps 702, 703, 704 and 705 until the first subset in the transform unit (TU) 1100 has been decoded, after any of subsets 4, 3 and 2 have been encoded, as required, after which the method 700 terminates.

A conventional method for decoding an 8×8 transform unit (TU) 1200 using a backward horizontal scan will be described with reference to FIGS. 7 and 12. The 8×8 transform unit (TU) 1200 does not make use of sub-blocks. A backward horizontal scan 1201 is applied over the entirety of the 8×8 transform unit (TU) 1200. The method 700 is applied is applied using the defined scan pattern.

A conventional method for decoding an 8×8 transform unit (TU) 1300 using a backward vertical scan will be described with reference to FIGS. 7 and 13. The 8×8 transform unit (TU) 1300 does not make use of sub-blocks. A backward vertical scan 1301 is applied over the entirety of the 8×8 transform unit (TU) 1300. The method 700 is applied using the defined scan pattern.

Embodiment—Encoding an 8×8 TU

A method 800 according to the present disclosure for encoding an 8×8 transform unit (TU) 1500 using a backward diagonal down-left scan will be described with reference to FIGS. 8, 10A, 10B, 14, 15A, 15B and 15C. The 8×8 transform unit (TU) 1500 seen in FIG. 15A has a sub-block size of 4×4. The transform unit (TU) 1500 represents a square lower level layer of coefficients to be scanned for encoding. Within each sub-block, such as a sub-block 1502 seen in FIG. 15C, a backward diagonal down-left scan 1505 is applied, as seen in FIG. 15C. When scanning the sub-blocks in the 8×8 transform unit (TU) 1500, a 2×2 backward diagonal down-left upper layer scan 1504 is applied to a square upper layer level 1503 representation thereof, as seen in FIG. 15B. As seen in FIG. 15B, the upper layer level 1503 includes a 2×2 arrangement of the lower layer level sub-blocks 1502. In this fashion, the significant coefficient group flags represent a non-overlapping region, such that the sub-blocks do not overlap in the lower level layer. The scan pattern 1501 of FIG. 15A therefore represents a combination of the pattern 1505 of FIG. 15C replicated four times according to the pattern 1504 of FIG. 15B. One advantage of this approach is that, rather than storing a pattern for a 64 (8×8) sized array as in FIGS. 11, 12 and 13, the pattern 1501 may be stored using a 4 (2×2)+16 (4×4)=20 sized array, resulting in a consequential reduction in memory usage. Further it will be appreciated that any of the array sizes 2×2, 4×4 and 8×8 for example, are square.

The method 800 is applied using the defined sub-block size and upper layer size and scan pattern. The method 800 encodes the residual coefficients of a transform unit (TU) using significant coefficient groups and will be described with reference to FIG. 8. The transform unit (TU) is divided into a number of sub-blocks. FIG. 10A depicts an exemplary upper square layer 1000 of a transform unit (TU).

Figure 14:
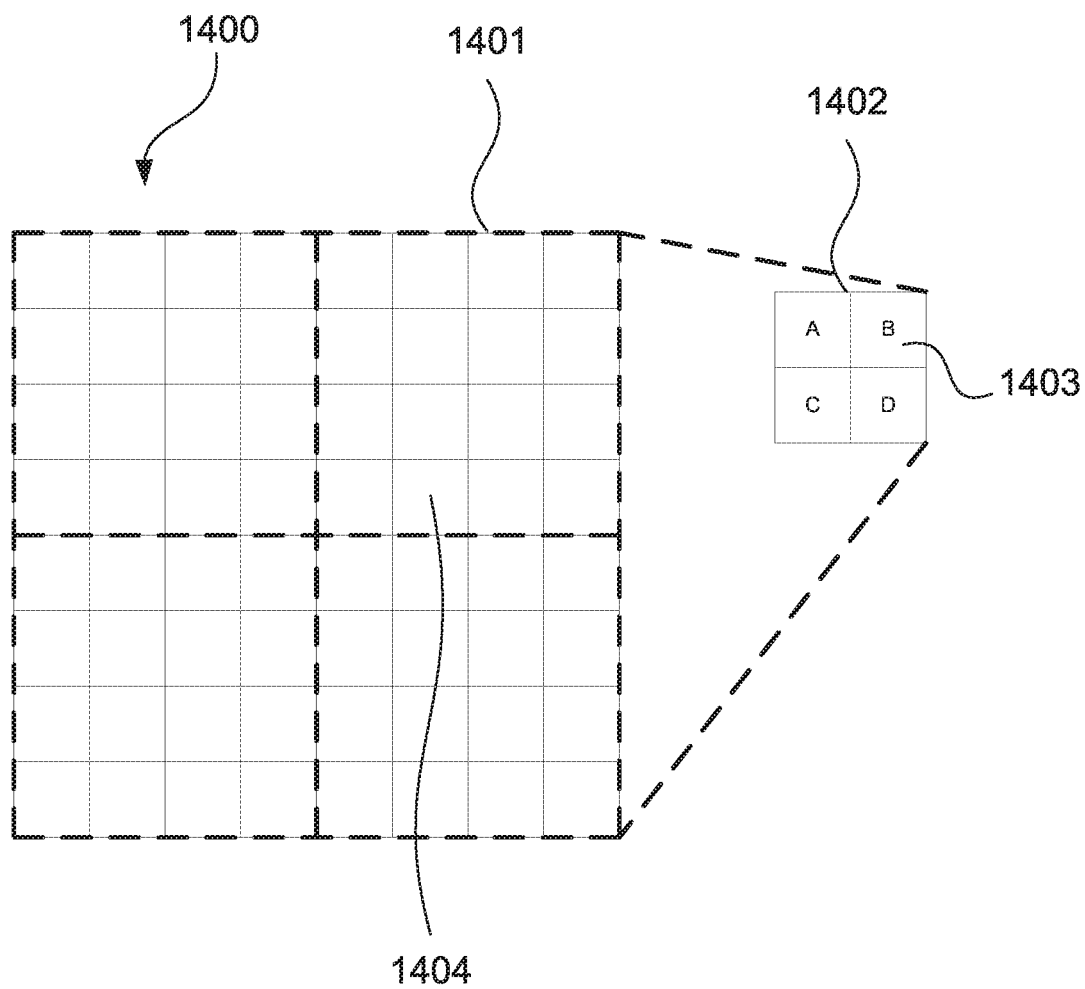
FIG. 14 is a diagram showing a method according to the present disclosure for scanning residual coefficients of an 8×8 transform unit (TU) using a two-layer hierarchy.
Figure 15A:
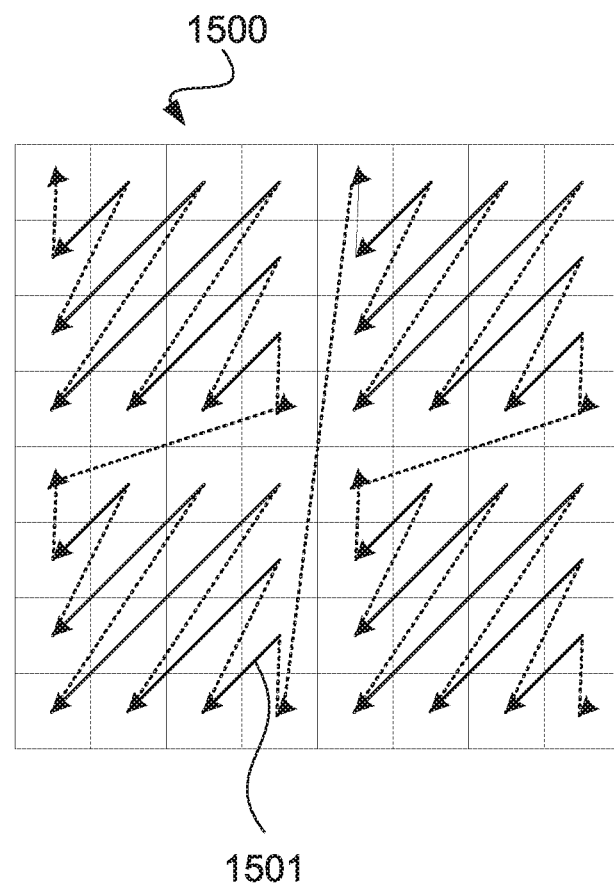
FIGS. 15A to 15C illustrate a method according to the present disclosure for scanning residual coefficients of an 8×8 transform unit (TU) using a backward diagonal scan.
Figures 15B, 15C:
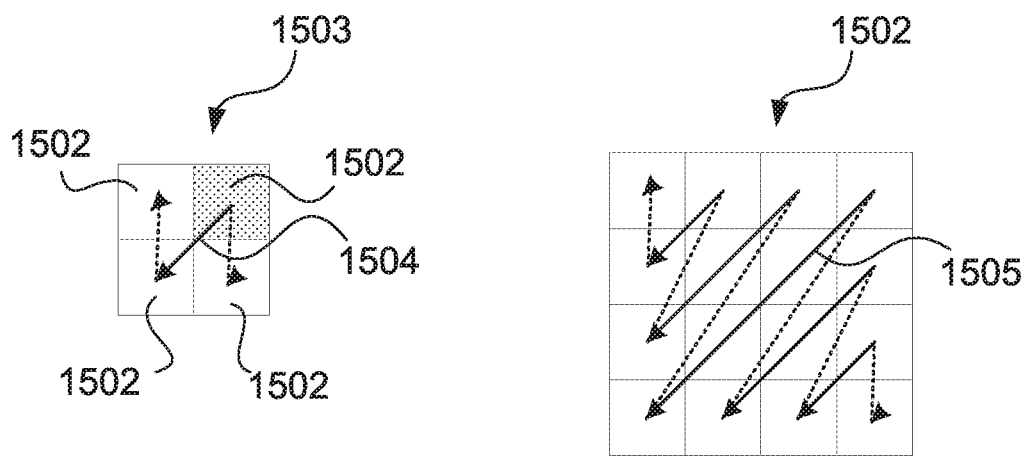

A 8×8 transform unit (TU) 1400 seen in FIG. 14, exemplary of the 8×8 transform unit (TU) 1500 of FIG. 15A, encodes residual coefficients in a two-layer (upper and lower) hierarchy. The 8×8 transform unit (TU) 1400 is divided into equally-sized sub-blocks, such as a 4×4 sub-block 1401. The sub-blocks in the transform unit (TU) 1400 are represented by an upper layer 1402. The upper layer 1402 includes significant coefficient group flags, such as the significant coefficient group flag 1403, each of which may be computed or inferred. When a significant coefficient group flag, such as the significant coefficient group flag 1403 is computed, the significant coefficient group flag indicates whether any of the residual coefficients, such as a residual coefficient 1404, within a corresponding sub-block, such as the sub-block 1401, are significant. When a significant coefficient group flag is inferred, it is possible for all the residual coefficients within the corresponding sub-block to be non-significant.

Figure 8:
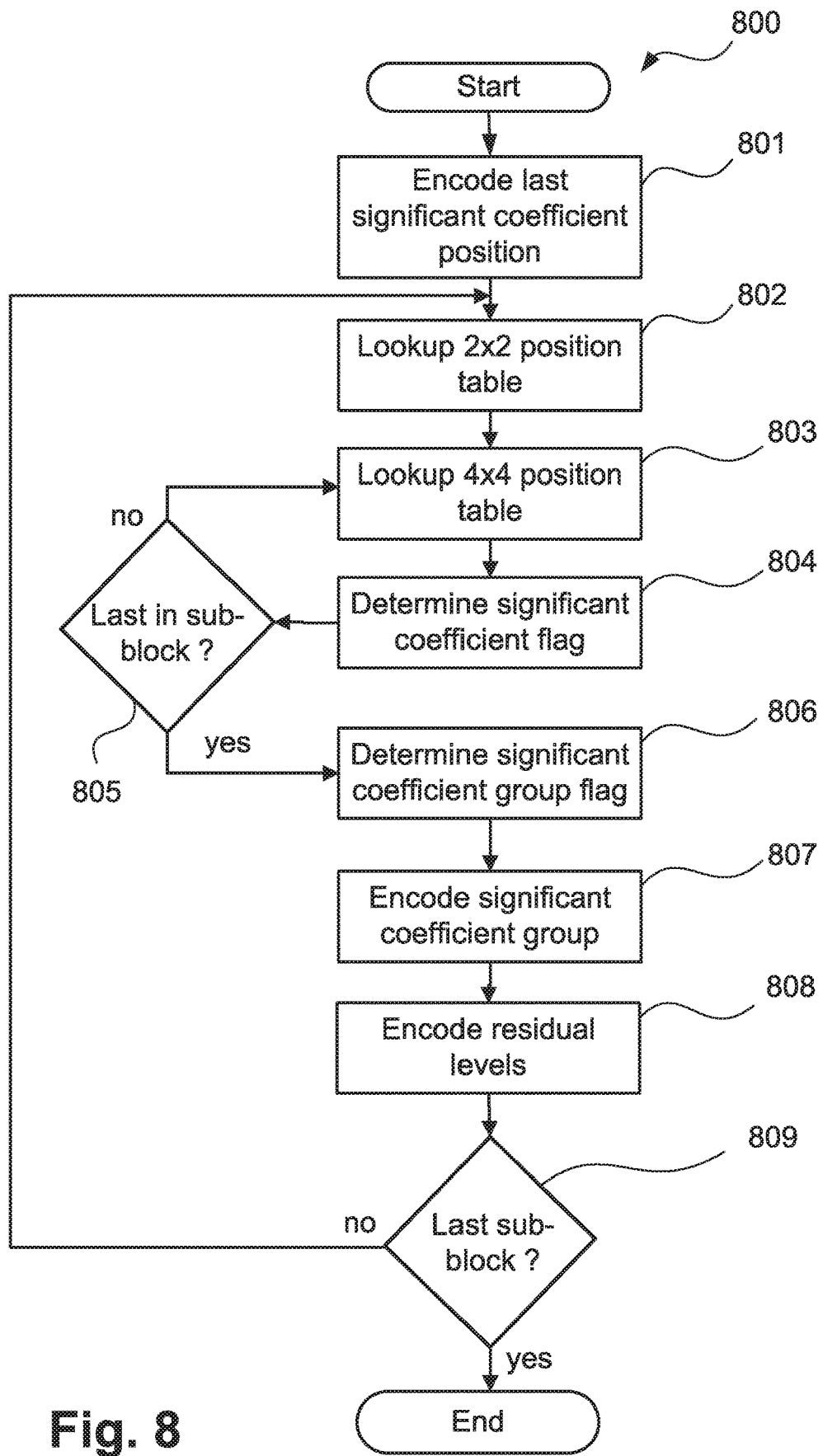
FIG. 8 is a flow diagram showing a method according to the present disclosure for encoding the residual coefficients of an 8×8 transform unit (TU) using significant coefficient groups.

In the method 800 seen in FIG. 8, an encode last significant coefficient position step 801 encodes the co-ordinate of the last significant coefficient along the two-level scan path. A lookup 2×2 table position step 802 determines the position for the current sub-block by applying a look-up to the 2×2 backward diagonal down-left upper layer scan 1504. This provides for correctly identifying the relevant sub-block 1502. A lookup 4×4 table position step 803 determines an offset within the position for the current significant coefficient by performing a look-up to a 4×4 backward diagonal down-left scan 1505 thus identifying the correct location within the current 4×4 sub-block 1502. A determine significant coefficient flag step 804 tests the value of the residual coefficient at the determined offset within the sub-block 1502, and thus within the 8×8 transform unit (TU) 1500, as significant (one-valued) if the residual coefficient is non-zero and non-significant (zero-valued) otherwise.

A last in sub-block test step 805 causes iteration over steps 803 and 804 such that all locations within sub-blocks not containing the last significant coefficient are tested, and for sub-sets containing the last significant coefficient, all locations preceding the last significant coefficient (where 'preceding' assumes application of scanning in a forward direction). For a backward scan, such as the pattern 1505, the last in a sub-block will always be the upper left location. For a forward scan, such will be either the lower right location for those sub-blocks not in possession of the last significant coefficient position, and will be the location immediately preceding the last significant coefficient position in the order of forward scan.

A determine significant coefficient group flag step 806 determines a significant coefficient flag to indicate if any (i.e.: at least one) of the significant coefficient flags within the sub-block are one-valued. For the sub-block containing the last significant coefficient, the significant coefficient group flag is inferred to be one-valued. For the sub-block located in the upper-left corner of the transform unit (TU) 1500, the significant coefficient group flag is also inferred to be one-valued. An encode significant coefficient group step 807 encodes information to determine the portion of the significance map contained in a sub-block. Firstly, significant coefficient group flags that were not inferred are encoded into the bitstream. Secondly, if the significant coefficient group flag is one-valued, the portion of the significance map contained in the sub-set is encoded into the bitstream. An encode residual values step 808 operates in a manner similar to the encode residual levels step 605, excepting for the arrangement of the significance map into the 2×2 upper layer and the 4×4 lower sub-block layer. A last sub-block test step 809 enables iteration over the sub-blocks, from the sub-block containing the last significant coefficient to the sub-block located in the upper-left corner of the transform unit (TU) 1500. After this sub-block is encoded, the method 800 terminates. It will be appreciated by those skilled in the art that the method 800 enables use of the 4×4 sub-block scan in all transform unit (TU) sizes supported by the video encoder 100.

The operation of the upper layer in determining the significant coefficient group flags will be described with reference to the exemplary upper layer 1000 seen in FIG. 10A. The exemplary upper layer 1000 consists of one significant_coeffgroup_flag per sub-block. For each sub-block in the exemplary upper layer 1000, a significant_coeffgroup_flag is either computed or inferred. For the upper-left sub-block in the exemplary upper layer 1000, the significant_coeffgroup_flag is always inferred as one-valued. For the sub-block in the exemplary upper layer 1000 containing the last significant coefficient, the significant_coeffgroup_flag is also inferred as one-valued. For other locations in the exemplary upper layer 1000, the significant_coeffgroup_flag, such as a significant_coeffgroup_flag X 1001, is inferred to be one-valued only if a right neighbour, such as a significant_coeffgroup_flag A 1002, and a below neighbour, such as a significant_coeffgroup_flag B 1003, are both one-valued. Where the right neighbour or the below neighbour significant_coeffgroup_flags fall outside the exemplary upper layer 1000, a zero value is inferred for the neighbour. When the significant_coeffgroup_flag is inferred, it is not encoded in the encoded bitstream 113. When the significant_coeffgroup_flag is not inferred, and if all the significant_coeff_flags within the corresponding sub-block are known to be zero-valued, then a zero-valued significant_coeffgroup_flag is computed. Alternatively, if at least one of the significant_coeff_flags within the corresponding sub-block is one-valued, then a one-valued significant_coeffgroup_flag is computed. The computed values of significant_coeffgroup_flag for the exemplary upper layer 1000 are encoded into the encoded bitstream 113 using a backward diagonal down-left scan.

For example, with reference to FIG. 10B, in an upper layer 1004, shaded significant_coeffgroup_flags, such as a significant_coeffgroup_flag 1005, are inferred to be one-valued based on the right neighbour and below neighbour, and accordingly are not encoded in the encoded bitstream 113. The significant_coeffgroup_flag 1006 contains the last significant coefficient and therefore is inferred as one-valued. Significant_coeffgroup_flags, such as a significant_coeffgroup_flag 1007, are located after the last significant coefficient and therefore no value is inferred or computed or encoded for these locations. A significant_coeffgroup_flag 1008, located in the upper left of the upper layer 804, is always inferred as one-valued.

When encoding each significant_coeffgroup_flag in the upper layer, a context is selected from the context model 404. For transform units (TUs) encoding luma samples and transform units (TUs) encoding chroma samples, two contexts are available, giving a total of four contexts for encoding the exemplary upper layer 1000. The context selection for each significant_coeffgroup_flag in the exemplary upper layer 1000 is dependent on the right neighbour and the below neighbour. As an exemplary case, the context for significant_coeffgroup_flag X 1001 is determined by performing a logical OR of the values of the significant_coeffgroup_flag A 1002 and the significant_coeffgroup_flag B 1003. Left neighbours and below neighbours falling outside the exemplary upper layer 1000 are inferred as zero-valued for the purpose of context selection.

A method according to the present disclosure for encoding an 8×8 transform unit (TU) 1600 using a backward horizontal scan will be described with reference to FIGS. 8, 16A, 16B and 16C. The 8×8 transform unit (TU) 1600 has a lower level sub-block size of 4×4. Within each sub-block, such as a sub-block 1602, a backward horizontal scan 1605 is applied, resulting in the overall scan pattern 1601 seen in FIG. 16A. To scan the sub-blocks 1602 in the 8×8 transform unit (TU) 1600, a 2×2 backward horizontal upper layer scan 1604 is applied. The method 800 is applied using the defined sub-block size and upper layer size and scan pattern.

A method according to the present disclosure for encoding an 8×8 transform unit (TU) 1700 using a backward vertical scan will be described with reference to FIGS. 8, 17A, 17B and 17C. The 8×8 transform unit (TU) 1700 has a sub-block size of 4×4. Within each lower layer sub-block, such as a sub-block 1702 of FIG. 17C, a backward vertical scan 1705 is applied. When scanning the sub-blocks in the 8×8 transform unit (TU) 1700, a 2×2 backward vertical upper layer scan 1704 seen in FIG. 17B is applied, resulting in the overall scan pattern 1701 seen in FIG. 17A. The method 800 is applied using the defined sub-block size and upper layer size and scan pattern.

Embodiment—Decoding 8×8 TU

A method according to the present disclosure for decoding the 8×8 transform unit (TU) 1500 will be described with reference to FIGS. 9, 15A, 15B and 15C. The 8×8 transform unit (TU) 1500 has a sub-block size of 4×4. Within each sub-block, such as a sub-block 1502, a backward diagonal down-left scan 1505 is applied. When scanning the sub-blocks in the 8×8 transform unit (TU) 1500, a 2×2 backward diagonal down-left scan 1504 is applied, resulting in the overall scan pattern 1501. The method 900 is applied using the defined sub-block size and upper layer size and scan pattern.

Figure 9:
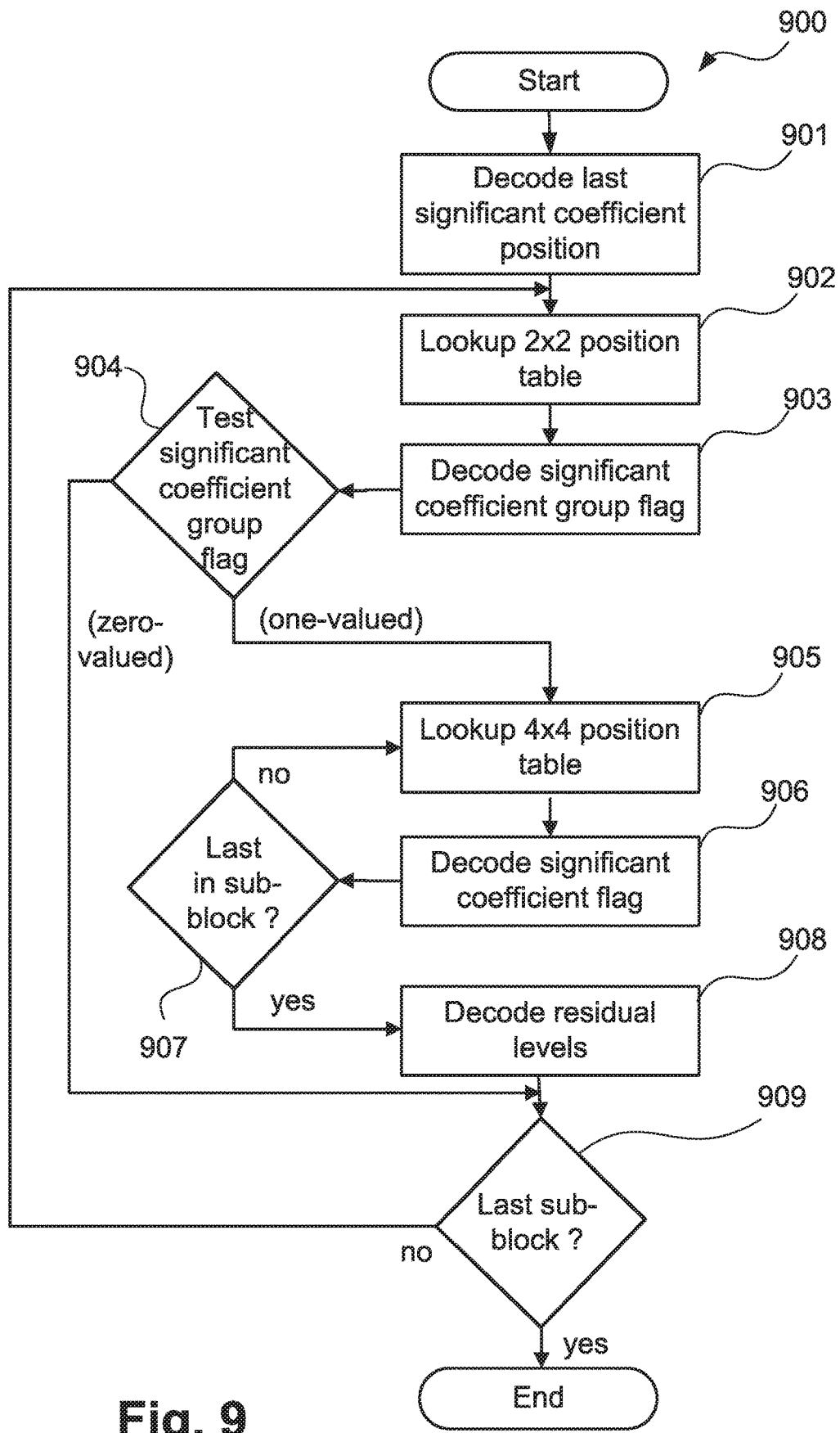
FIG. 9 is a flow diagram showing a method according to the present disclosure for decoding the residual coefficients of an 8×8 transform unit (TU) using significant coefficient groups.

A method 900 for decoding the residual coefficients of a transform unit (TU) using significant coefficient groups will be described with reference to FIG. 9. The transform unit (TU) is divided into a number of sub-blocks. A decode last significant coefficient position step 901 decodes the co-ordinate of the last significant coefficient in the transform unit (TU) 1500 along the two-level scan path 1501. A lookup 2×2 table position step 902 determines the position for the current sub-block by applying a look-up to the 2×2 backward diagonal down-left upper layer scan 1504. A decode significant coefficient group step 903 either determines the inferred value of a significant coefficient flag, using the analogous process to that described in the determine significant coefficient group flag step 806, or decodes one significant coefficient group flag from the encoded bitstream 113. A test significant coefficient group flag step 904 tests the value of the determined significant coefficient group flag. If the flag is one-valued, control passes to a lookup 4×4 table position step 905, otherwise, where the flag is zero-valued, control passes to a last sub-block test step 909. Step 905 determines an offset within the position for the current significant coefficient by performing a look-up to a 4×4 backward diagonal down-left scan. The result of the lookup 4×4 table position step 905 is combined with the result of the lookup 2×2 table position step 902 to provide a position offset into the 8×8 transform unit (TU) 1500. A decode significant coefficient flag step 906 then decodes a significant coefficient flag for one residual coefficient within the sub-block, such as the sub-block 1502. When the final significant coefficient within the sub-block is reached, and no previous significant coefficient in the sub-block was one-valued, and the corresponding significant coefficient group flag was computed (i.e. was not inferred), the final significant coefficient within the sub-block is inferred to be one-valued. A last in sub-block test step 907 tests the position within the sub-block, looping over steps 905 and 906 until the 4×4 sub-block 1502 has been processed in its entirety. For the first sub-block to be processed, containing the last significant coefficient flag, only locations after (where 'after' is defined as in a backward scan order) are iterated over in the sub-block. When the last position of a sub-block has been processed, a decode residual levels step 908 decodes the residual levels in a manner similar to the decode residual levels step 705. A last sub-block test step 909 provides iteration over all the sub-blocks in the transform unit (TU) 1500, starting from the sub-block containing the last significant coefficient and working backward until the sub-block located in the upper-left corner of the transform unit (TU) 1500 is processed by steps 902-908, after which the method 900 terminates. It will be appreciated by those skilled in the art that the method 900 enables use of the 4×4 sub-block scan in all transform unit (TU) sizes supported by the video decoder 200.

A method according to the present disclosure for decoding the 8×8 transform unit (TU) 1600 will be described with reference to FIGS. 9, 16A, 16B and 16C. The 8×8 transform unit (TU) 1600 has a sub-block size of 4×4. Within each sub-block, such as a sub-block 1602, a backward horizontal scan 1605 is applied. When scanning the sub-blocks in the 8×8 transform unit (TU) 1600, a 2×2 backward horizontal scan 1604 is applied. The method 900 is applied using the defined sub-block size and upper layer size and scan pattern.

A method according to the present disclosure for decoding the 8×8 transform unit (TU) 1700 will be described with reference to FIGS. 9, 17A, 17B and 17C. The 8×8 transform unit (TU) 1700 has a sub-block size of 4×4. Within each sub-block, such as a sub-block 1702, a backward vertical scan 1705 is applied. When scanning the sub-blocks in the 8×8 transform unit (TU) 1700, a 2×2 backward vertical scan 1704 is applied. The method 900 is applied using the defined sub-block size and upper layer size and scan pattern.

Embodiment—Diagonal Upper Layer Scan Only for 8×8 Transform Unit

Although the methods 800 and 900 applied to transform units (TUs) 1500, 1600 and 1700 each applied the same scan pattern from the sub-block layer to the upper layer. One alternative is to use only the backward diagonal down-left scan for the upper layer scan for the transform units (TUs) 1500, 1600 and 1700. Further, the upper layer scan may be set to backward diagonal down-left for all transform unit sizes. The scan pattern of the upper layer is then independent of the scan pattern of the lower layer. Doing so eliminates the need for memory storage for the 2×2 backward horizontal scan 1604 and the 2×2 backward diagonal vertical scan 1704.

Embodiment—Reuse 8×8 Transform Unit Scan for 32×32 Upper Layer Scan

A 32×32 transform unit makes use of an 8×8 upper layer scan, being a backward diagonal down-left scan. It is possible to replace the 8×8 upper layer scan with the 8×8 backward diagonal scan 1500, derived from the 2×2 backward diagonal scan 1504 and the 4×4 backward diagonal scan 1505. Such an arrangement enables the removal of the look-up table for the 8×8 upper layer scan, reducing memory storage requirements.

Those skilled in the art will appreciate that the methods 600 and 700 when applied with the specified sub-block sizes enable a reduction in the number of tables present in the video encoder 100 or the video decoder 200.

Embodiment—Scanning Using Offsets

Figures 18A, 18B, 18C:
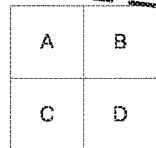
FIGS. 18A to 18C illustrate an alternative approach to scanning that makes use of offsets.

FIGS. 18A to 18C illustrate a further implementation where a linear array of values is derived from the two-dimensional (2D) array, and offsets are used in the linear array to establish the distinction between different sub-blocks of the 2D array. FIG. 18A illustrates an 8×8 transform unit is accessed as 4 off 4×4 units (sub-blocks) in an order of A, B, C and D, being a forward-downward scan (horizontal, and left to right), with each sub-block being traversed according to a forward-downward scan. Those skilled in the art will appreciate that the implementation illustrated in FIGS. 18A to 18C also enables scanning the 8×8 transform unit in a backward direction.

As seen in FIG. 18B, scanning of each sub-block results in a corresponding linear array of values. Where desired, the four arrays of FIG. 18B may be stored as such to inherently define the access order of the scanning of the values of the corresponding transform unit.

Alternatively, as illustrated in FIG. 18C, the scanning of the transform unit of FIG. 18A may be stored as a single linear array of 16 (=4×4) values where an offset (X) is used to reconstruct the 4 arrays. By changing X from 0, 4, 32 and 36, each of the four arrays of FIG. 18B may be reconstructed.

Summary

The various arrangements presently disclosed provide for the encoding and decoding of a transform unit having upper and lower level square layers, where the upper level layer represents a square arrangement of at most four significant coefficient group flags (e.g.: 2×2). This is seen in FIGS. 15B,16B and 17B for example. This permits efficient traversal of the lower level 8×8 square layer (FIGS. 15A, 16A and 17A respectively) according to a desired scan pattern applied to 4×4 sub-block (FIGS. 15C, 16C and 17C respectively). As such an 8×8 transform unit may be encoded or decoded using a combination of a 4×4 lower level scan and a 2×2 upper level scan.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

The invention claimed is:

1. A method of decoding video data from a bitstream, the method being characterized in comprising:
   receiving, from the bitstream, encoded data of residual coefficients for a transform unit represented as a predetermined size of a square block, encoded data of at least one significant coefficient group flag for indicating whether at least one of residual coefficients within a corresponding sub-block of the square block is significant, and encoded data of a position of a last significant coefficient in the square block;
   determining a scan order of the at least one significant coefficient group flag for the transform unit from a plurality of scan orders of the at least one significant coefficient group flag according to an intra-prediction mode corresponding to the transform unit from a plurality of intra-prediction modes, wherein a first scan order of the at least one significant coefficient group flag is determined if the intra-prediction mode corresponding to the transform unit is a first intra-prediction mode and a second scan order of the at least one significant coefficient group flag is determined if the intra-prediction mode corresponding to the transform unit is a second intra-prediction mode different from the first intra-prediction mode, and the second scan order of the at least one significant coefficient group flag is different from the first scan order of the significant coefficient group flag;
   determining a scan order of the residual coefficients for the transform unit from a plurality of scan orders of the residual coefficients according to the intra-prediction mode corresponding to the transform unit from the plurality of intra-prediction modes, wherein a first scan order of the residual coefficients is determined if the intra-prediction mode corresponding to the transform unit is the first intra-prediction mode and a second scan order of the residual coefficients is determined if the intra-prediction mode corresponding to the transform unit is the second intra-prediction mode different from the first intra-prediction mode, and the second scan order of the residual coefficients is different from the first scan order of the residual coefficients;
   determining the at least one significant coefficient group flag corresponding to respective sub-blocks of the block according to the determined scan order of the at least one significant coefficient group flag; and
   decoding residual coefficients of the transform unit according to the determined at least one significant coefficient group flag, the determined scan order of the residual coefficients, and the position of last significant coefficient in the square block, to generate the video data.

2. A method according to claim 1, wherein the determined scan order of the at least one significant coefficient group flag for the transform unit is one of backward horizontal, backward vertical and backward diagonal scan orders.

3. A method according to claim 1, wherein the determined scan order of the residual coefficients for the transform unit is one of backward horizontal, backward vertical and backward diagonal scan orders.

4. A method according to claim 1, wherein encoded data of the residual coefficients is scanned sub-block by sub-block in accordance with the determined scan order of the residual coefficient.

* * * * *